March 27, 1945. A. SVOBODA 2,372,613
FIRE DIRECTOR FOR ANTIAIRCRAFT GUNS
Filed Nov. 13, 1941 13 Sheets-Sheet 4

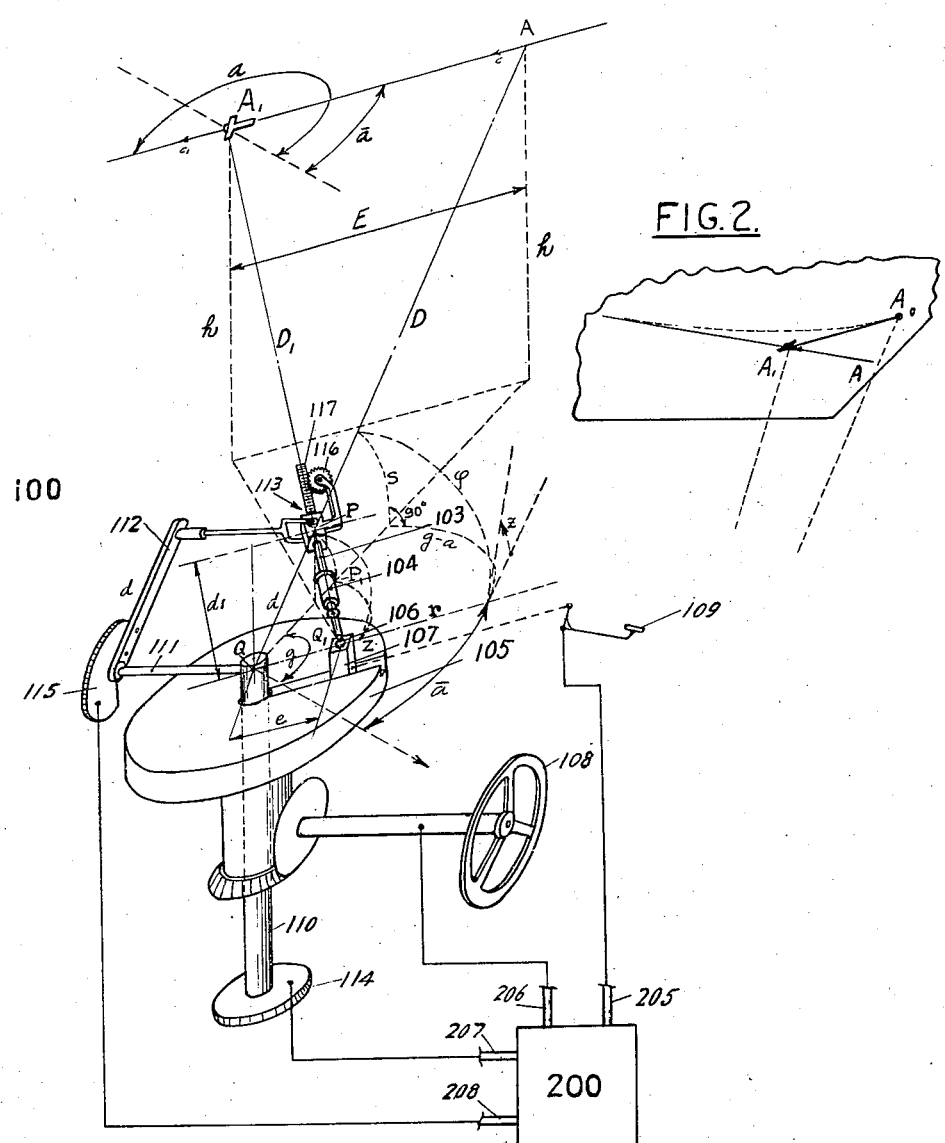

INVENTOR.
ANTONIN SVOBODA
BY
Byerly, Watson & Simonds
ATTORNEYS

March 27, 1945.  A. SVOBODA  2,372,613
FIRE DIRECTOR FOR ANTIAIRCRAFT GUNS
Filed Nov. 13, 1941  13 Sheets-Sheet 5

INVENTOR
Antonin Svoboda
BY
Byrly, Watson, & Simonds
ATTORNEYS

March 27, 1945. A. SVOBODA 2,372,613
FIRE DIRECTOR FOR ANTIAIRCRAFT GUNS
Filed Nov. 13, 1941 13 Sheets-Sheet 6

INVENTOR
Antonin Svoboda
BY
Byerly Watson & Simonds
ATTORNEYS

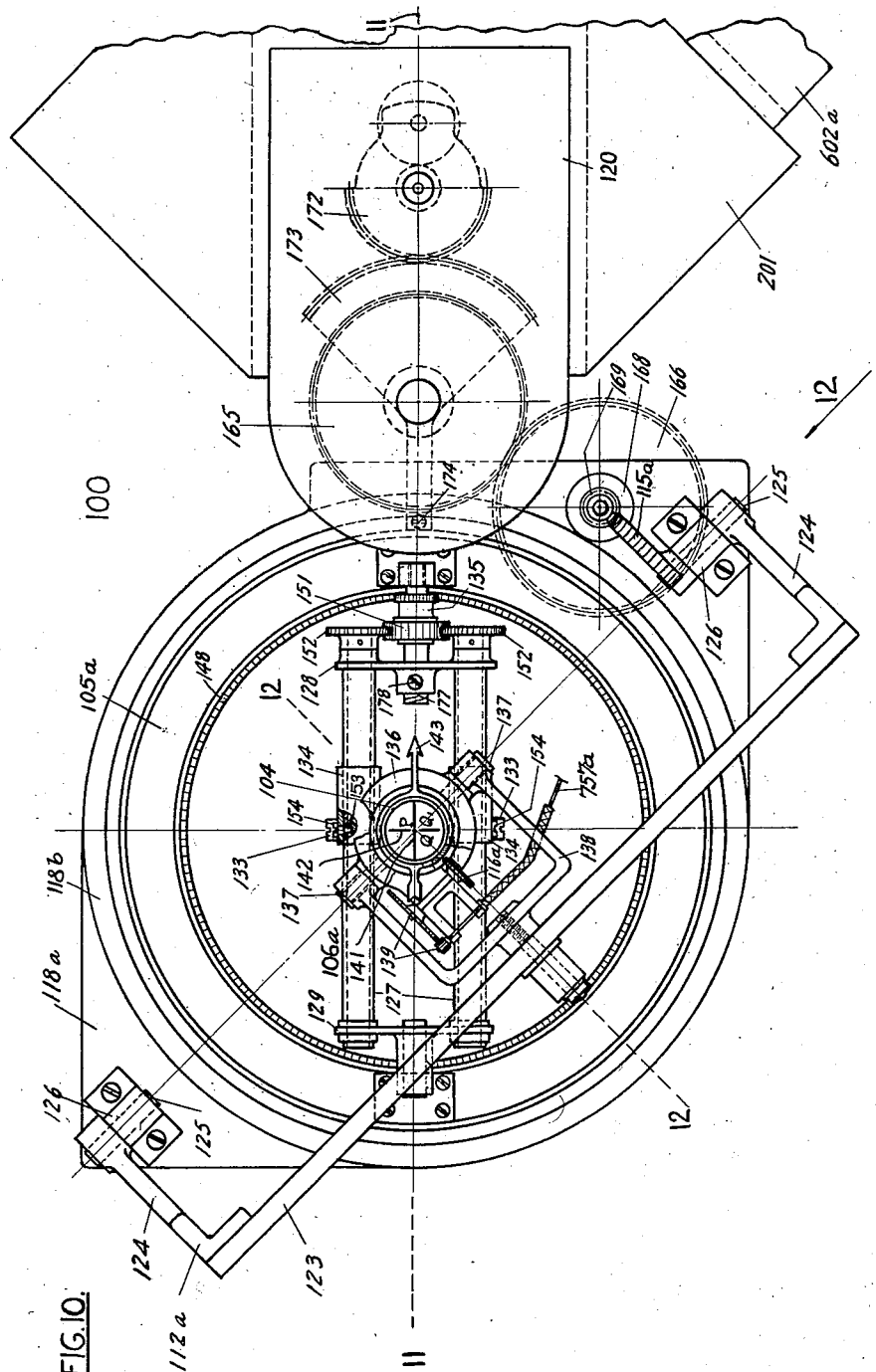

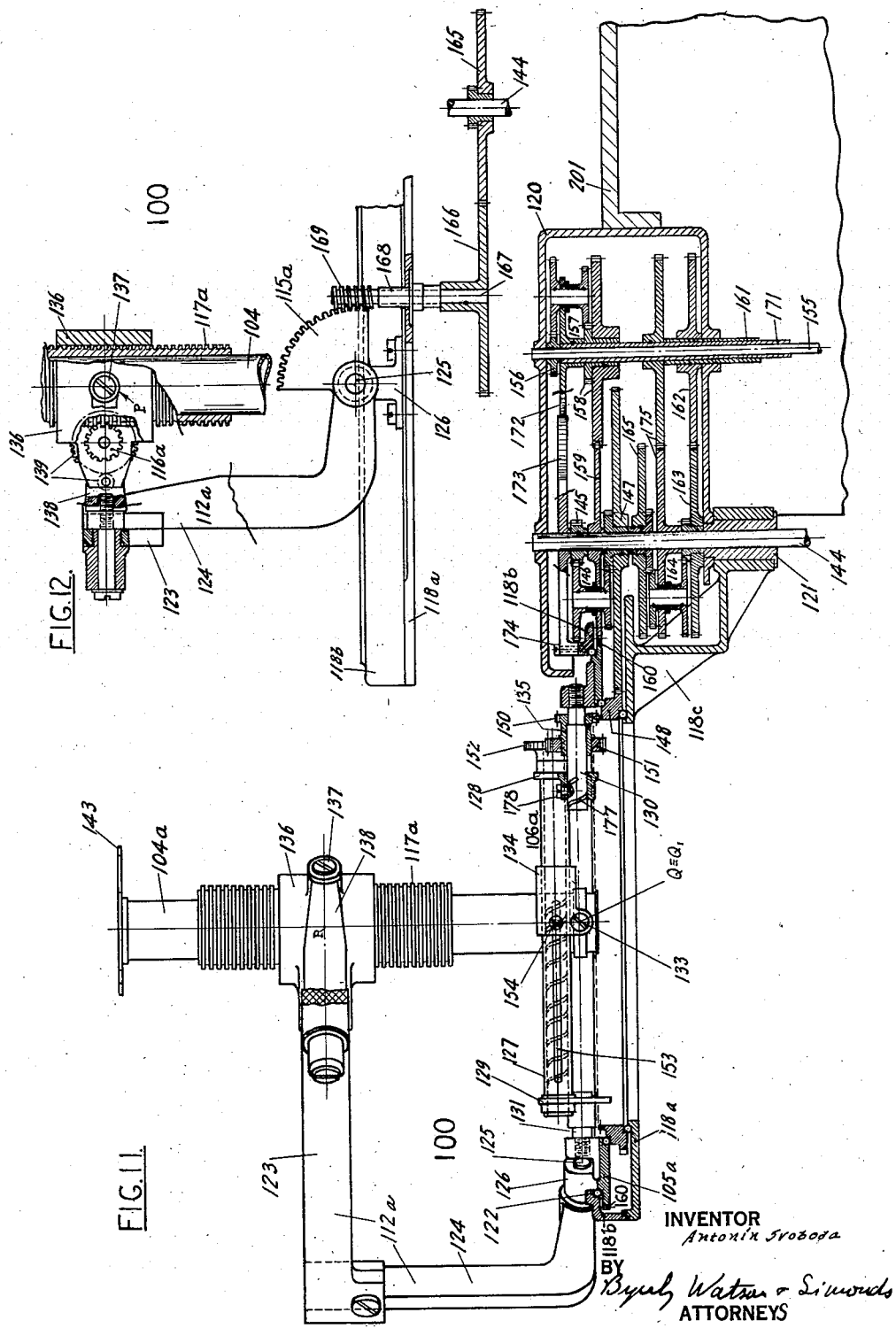

March 27, 1945.   A. SVOBODA   2,372,613
FIRE DIRECTOR FOR ANTIAIRCRAFT GUNS
Filed Nov. 13, 1941   13 Sheets-Sheet 9
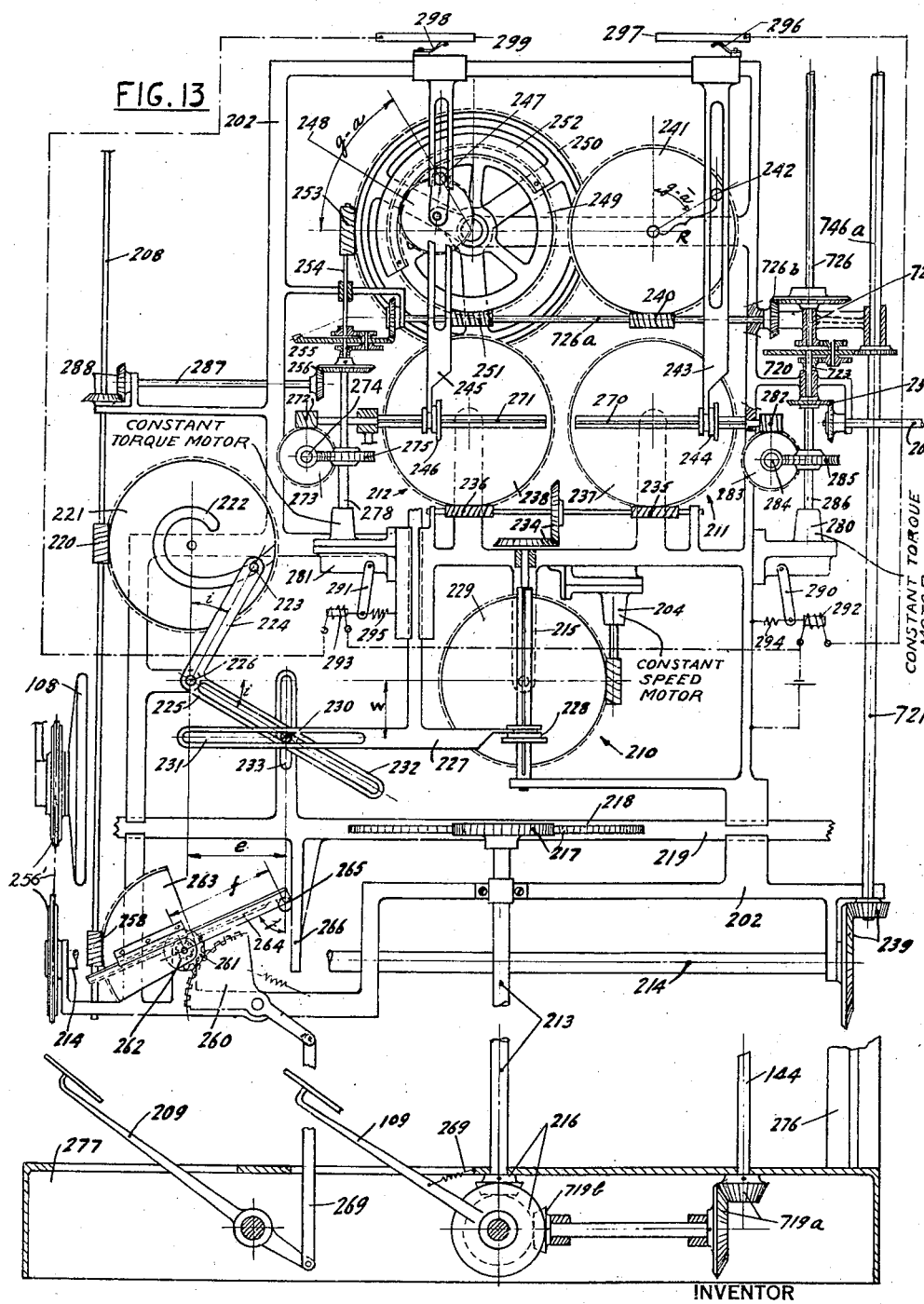

March 27, 1945. A. SVOBODA 2,372,613
FIRE DIRECTOR FOR ANTIAIRCRAFT GUNS
Filed Nov. 13, 1941 13 Sheets-Sheet 10

INVENTOR
Antonin Svoboda
BY
Byerly Watson Simonds
ATTORNEYS

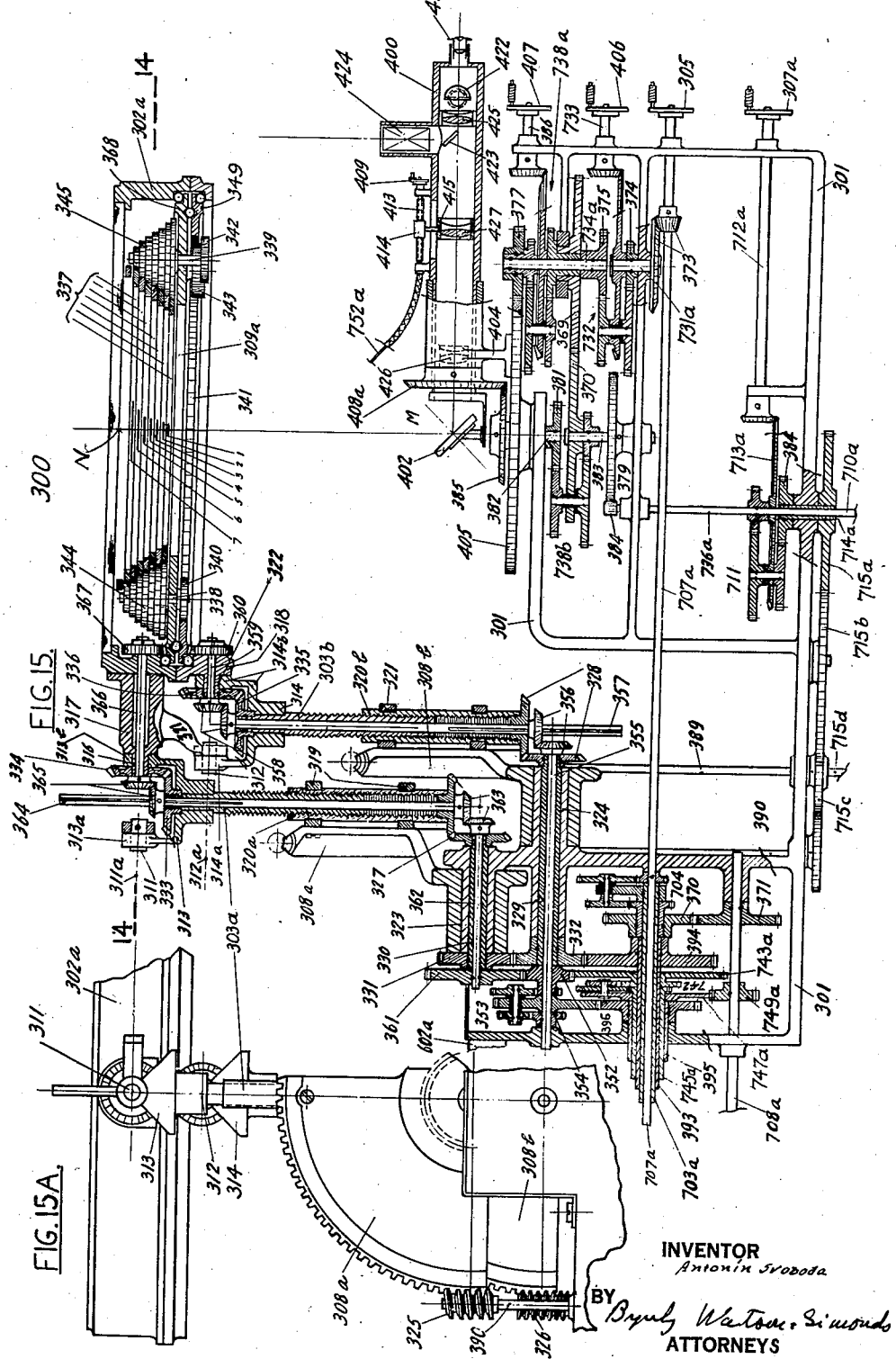

March 27, 1945.　　　A. SVOBODA　　　2,372,613
FIRE DIRECTOR FOR ANTIAIRCRAFT GUNS
Filed Nov. 13, 1941　　　13 Sheets-Sheet 12
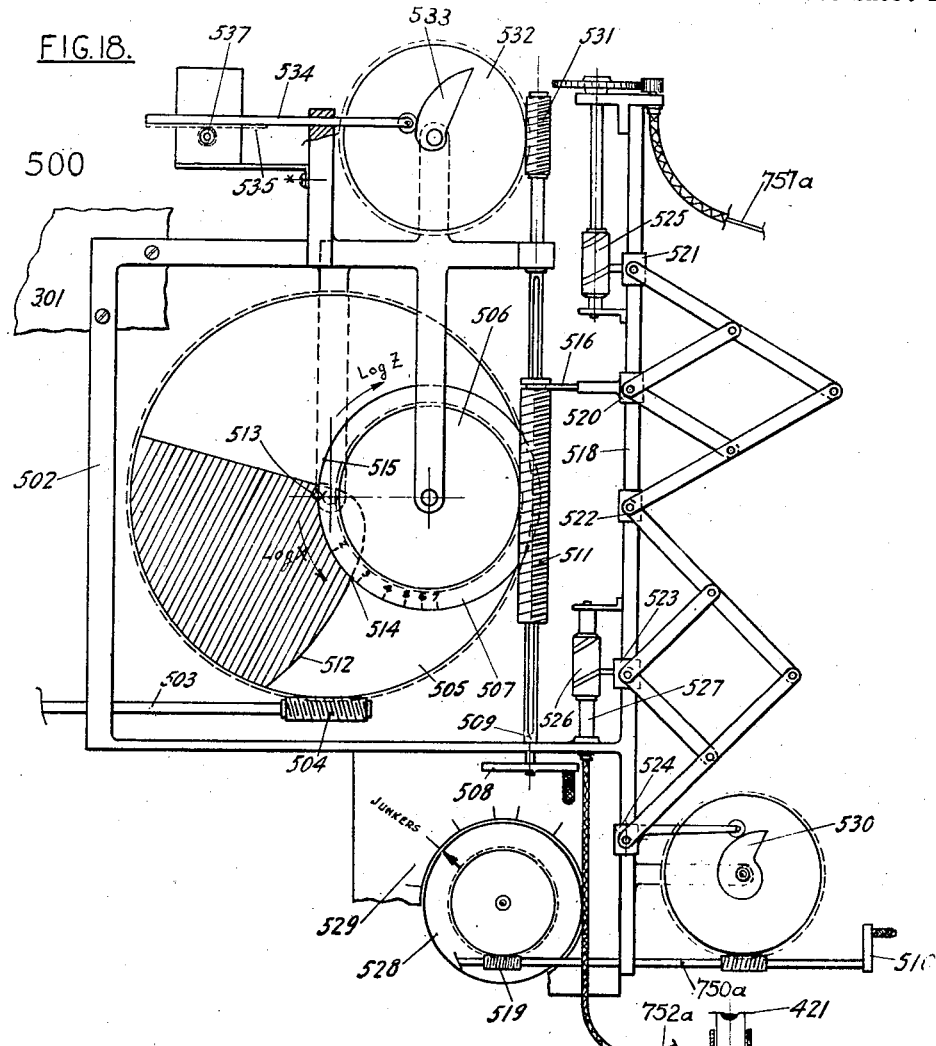
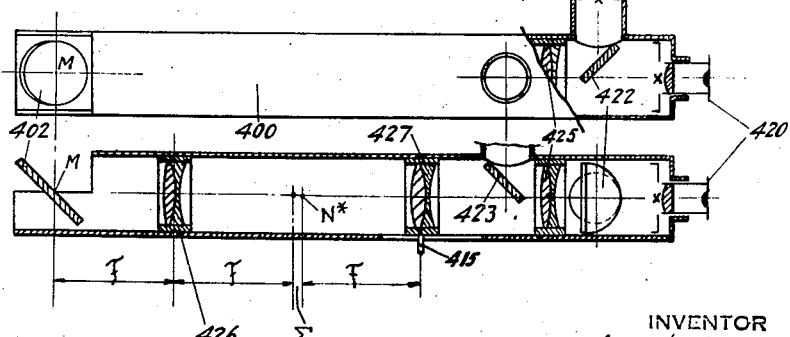
INVENTOR
Antonín Svoboda
BY
ATTORNEYS March 27, 1945.  A. SVOBODA  2,372,613
FIRE DIRECTOR FOR ANTIAIRCRAFT GUNS
Filed Nov. 13, 1941  13 Sheets-Sheet 13
FIG. 19.
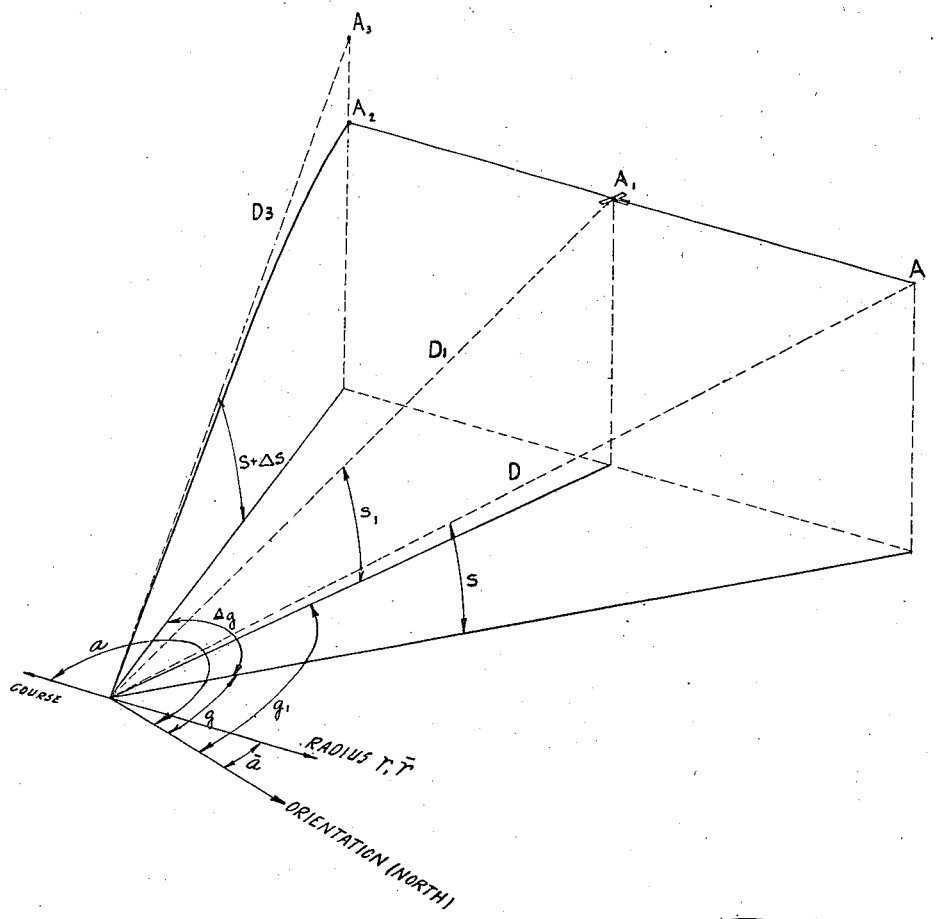
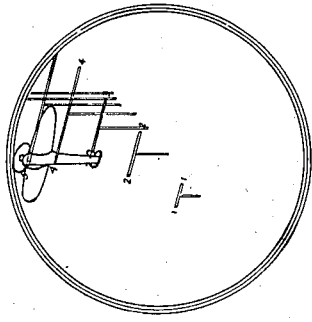
FIG. 20A.
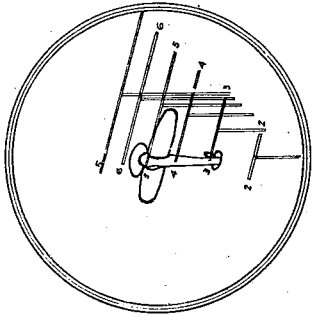
FIG. 20B.
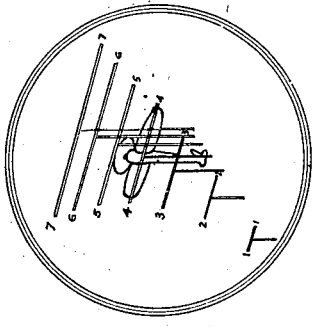
FIG. 20C.
INVENTOR
Antonín Svoboda
BY
Byrub, Watson, Simonds
ATTORNEYS Patented Mar. 27, 1945

2,372,613

UNITED STATES PATENT OFFICE 2,372,613

FIRE DIRECTOR FOR ANTIAIRCRAFT GUNS

Antonin Svoboda, Forest Hills, N. Y.

Application November 13, 1941, Serial No. 418,877

32 Claims. (Cl. 33—49)

This invention relates to fire directors for anti-aircraft guns and is directed particularly to a fire director for guns of small or medium caliber.

The use of anti-aircraft guns against dive bombers and other low-flying enemy aircraft has heretofore proved ineffective owing to the high speed of the airplanes and the extremely short time—usually not over thirty seconds—available for aiming the gun. The fire director apparatus used with guns of large caliber for firing on enemy aircraft flying at high altitudes is not suitable for use on anti-aircraft guns of small caliber owing to their comparatively short fire range. On the other hand, it has proved impossible to train and elevate a small anti-aircraft gun by hand fast enough to follow and aim at a low-flying, rapidly-moving airplane because of the extremely rapid change of its bearing and elevation angles.

My invention provides what I believe to be the first effective means for combating dive bombers and other low-flying rapidly-moving enemy airplanes. It provides an anti-aircraft gun with power-driven training and elevating means controlled by sights which are moved in part automatically and which may be very easily and rapidly manipulated so as to follow a rapidly-moving, low-flying target and to aim the gun for firing on the target. The operation is so rapid that the first aiming is accomplished within five or ten seconds with a result that several accurately aimed shots at a low-flying, high-speed airplane may be fired within the thirty seconds or so which are available.

A fire director embodying my invention can be placed directly on the carriage of an anti-aircraft gun of small caliber. In the new fire director, there are two sights which take the place of the telescope, the altimeter and the course finder usually used in fire directors for anti-aircraft guns. The first sight, which I term the target-follower, is moved in part mechanically and in part manually and is so arranged that it may be easily and quickly set and held on a rapidly moving airplane. This target-follower is so connected with the gun training and elevating mechanism that, when it is held on a moving airplane, the gun and the second sight are directed approximately toward the airplane. The manual movements given to the follower to keep it on the plane indicate the course of the airplane and the speed of the airplane divided by its distance. The second sight, which I term the aiming pointer, is a combined range finder and pointer and is set by placing the image of a small model of the airplane in exact coincidence with the airplane as seen through the sight. The operation of the aiming pointer is made easy by the fact that it is directed approximately toward the airplane by the pointing of the target-follower so that the airplane appears substantially stationary in it. The position of the model airplane is arranged in accordance with data obtained from the first sight and known data as to the size of the enemy airplane. The aiming pointer is so connected to the training and elevating mechanism of the gun that when coincidence of the images of the airplane and the model is obtained in it, the gun is directed above and ahead of the airplane to the extent necessary to hit the airplane.

Thus in the operation of the new fire director a sight easily directable at a moving airplane is held on the airplane and thereby aims the gun and a second sight approximately toward the airplane. The second sight may then easily be set exactly and such setting of it changes the training and elevation of the gun to the exact position required for firing. The operation of the gun is, therefore, both easy and accurate.

Each of the two sights used in the new fire director apparatus involves novel principles of construction and operation and, while the two new sights find their greatest utility when used in combination in a single fire director apparatus, it will be apparent from the description that follows that each of the two sights is capable of use independently of the other in various different types of fire director apparatus. My invention thus includes a new fire director apparatus for antiaircraft guns of small and medium caliber and also two new sights of general utility in fire director apparatus.

In the drawings accompanying this application, Figs. 1 to 5 are diagrams indicating the principles of operation and construction of my new fire director apparatus:

Fig. 1 is a diagram showing the principle of the target-follower and indicating its construction in simplified perspective;

Fig. 2 is a diagram showing a horizontal plane on which the target is moving;

Figure 3:
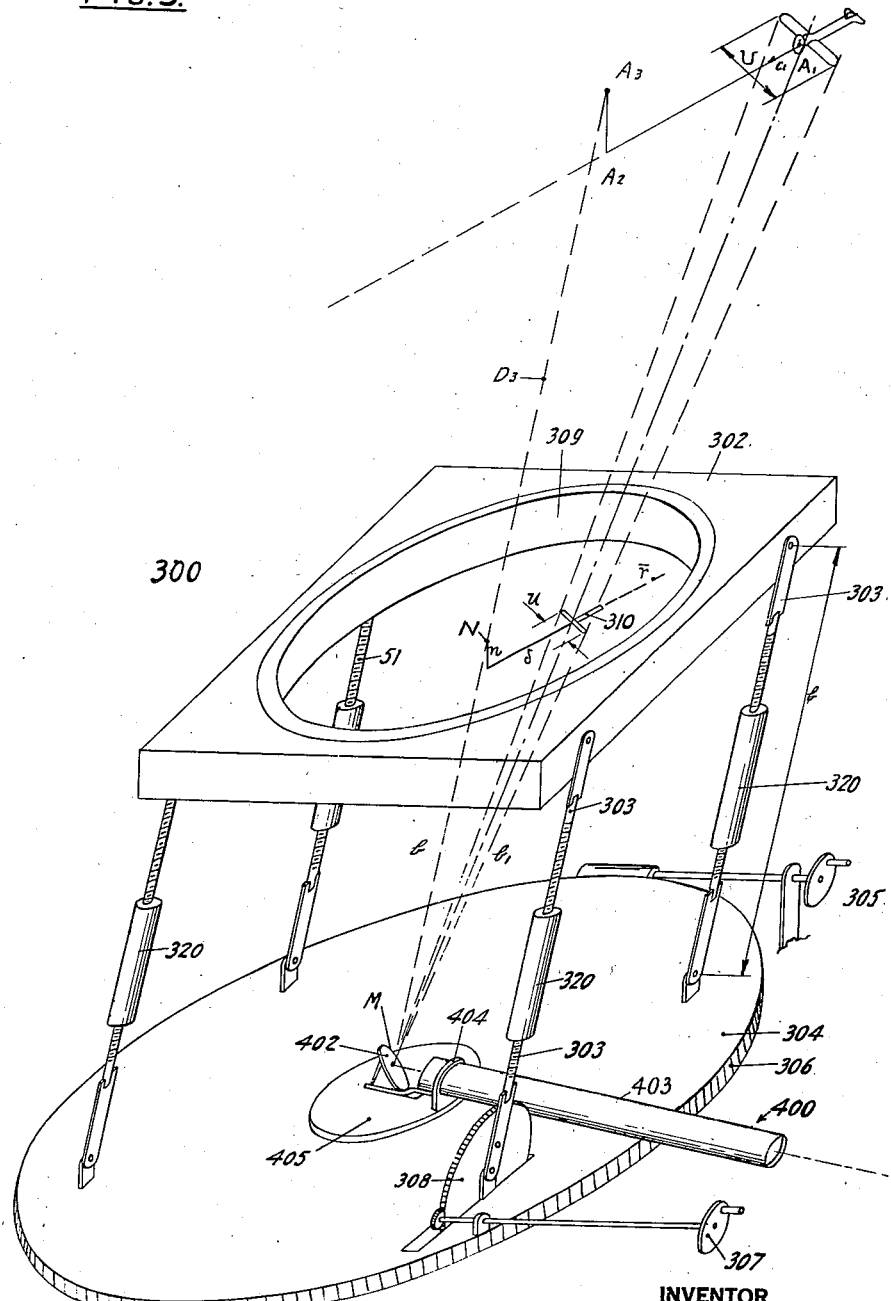
Figure 4:
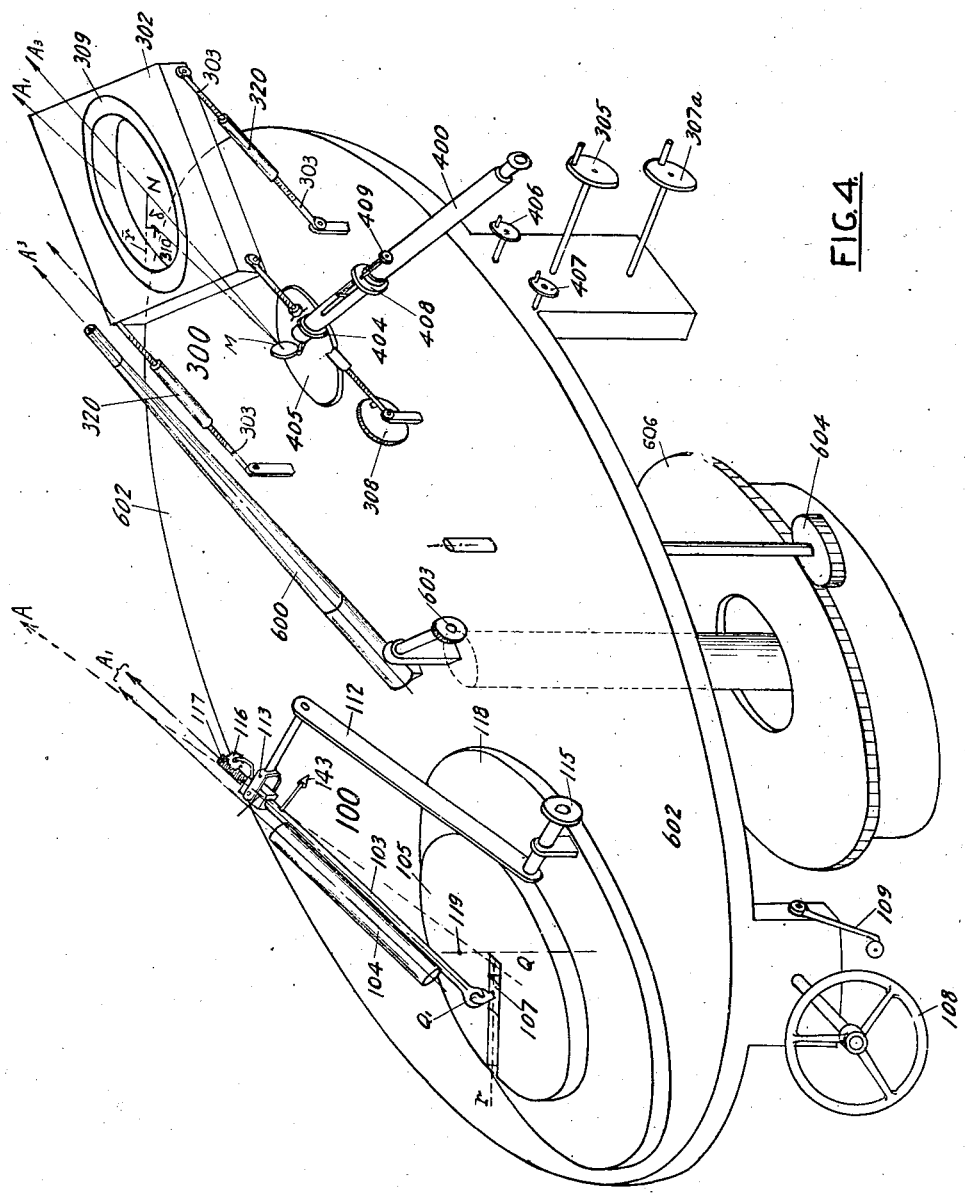
Figure 5:
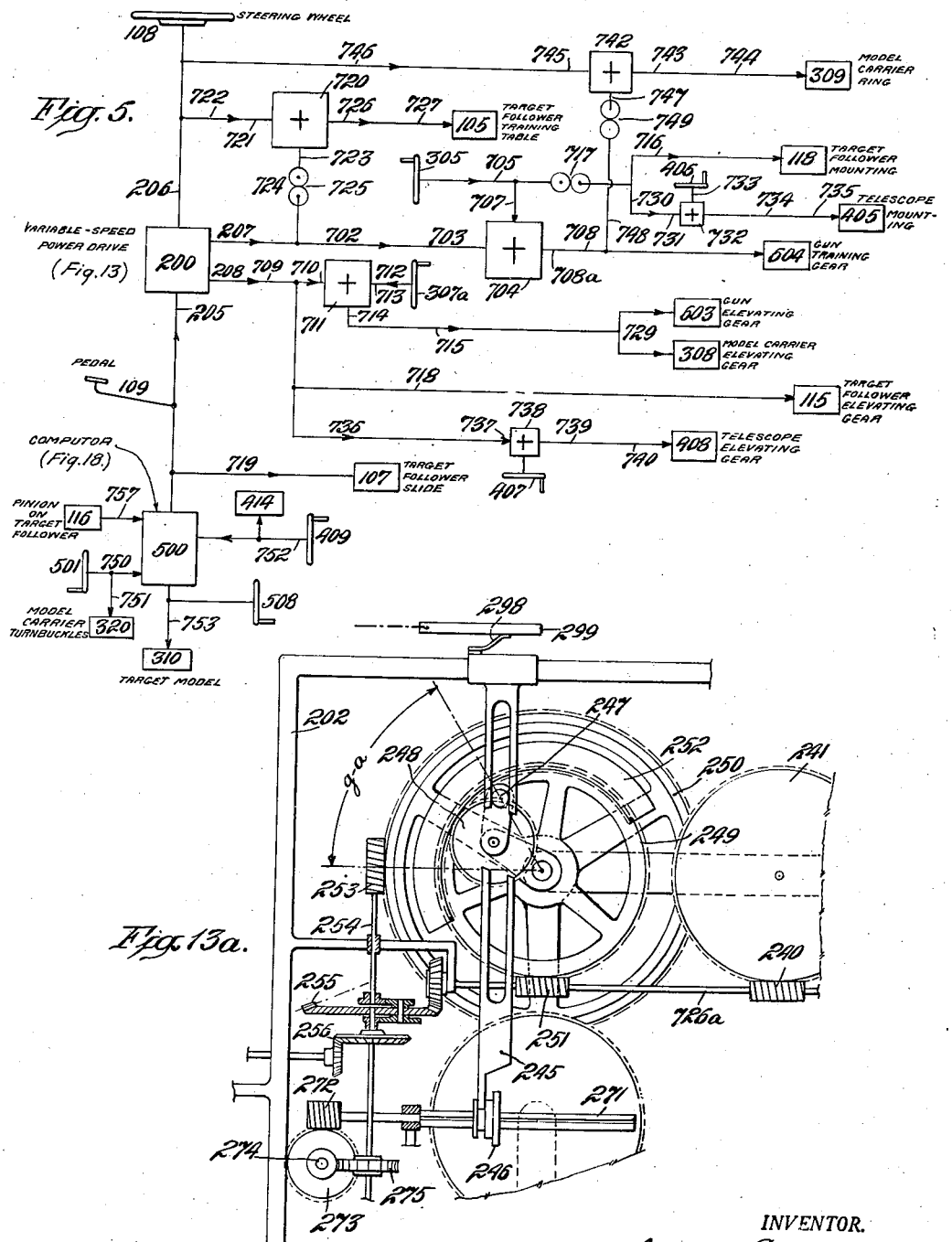

Fig. 3 is a diagram showing the principle of the aiming pointer and indicating its construction in simplified perspective; and Figs. 4 and 5 are a diagram showing the principle of a fire director consisting of the target-follower and aiming pointer combined with a gun mounting, Fig. 4 showing the assembly in ed perspective and Fig. 5 showing sche-
lly the operative connections between
f the assembly shown in Fig. 4.

Figure 6:
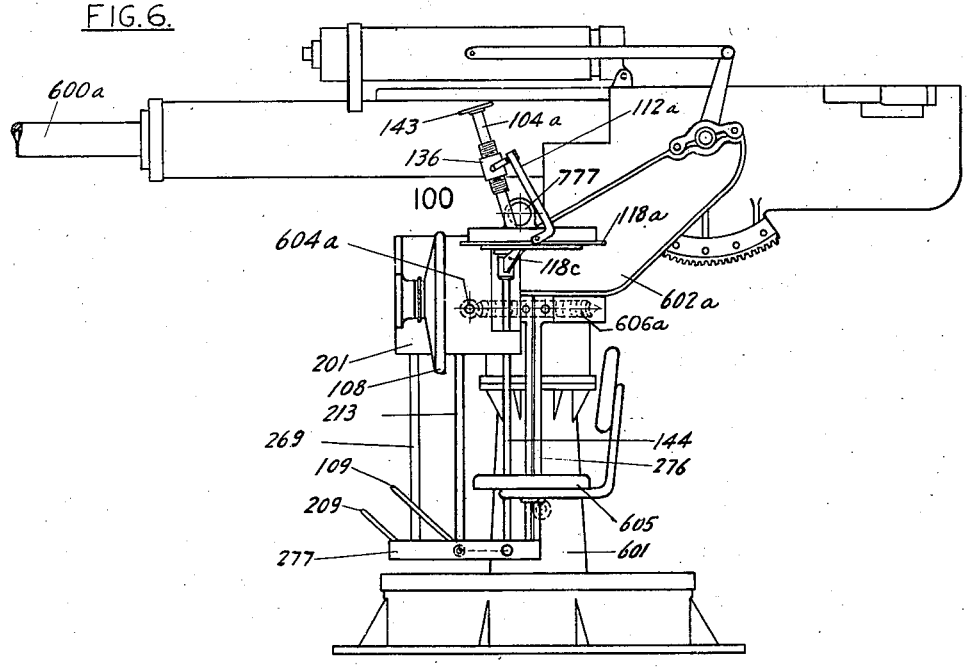
Figure 7:
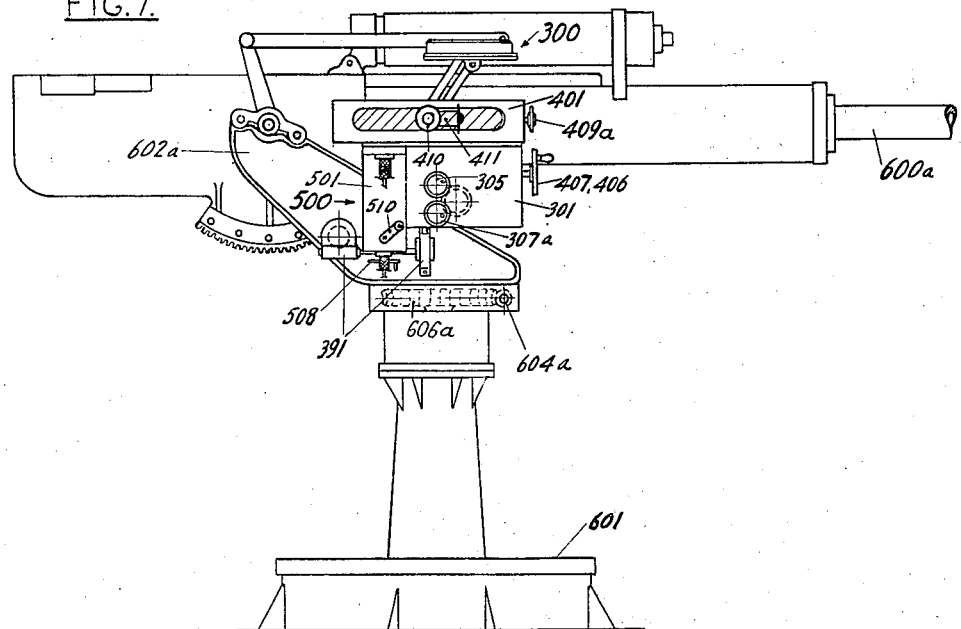
Figure 8:
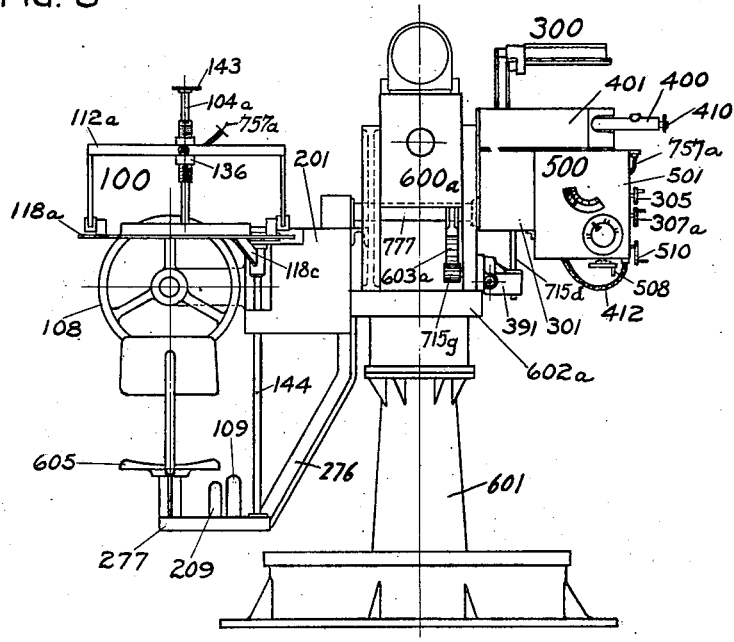
Figure 14:
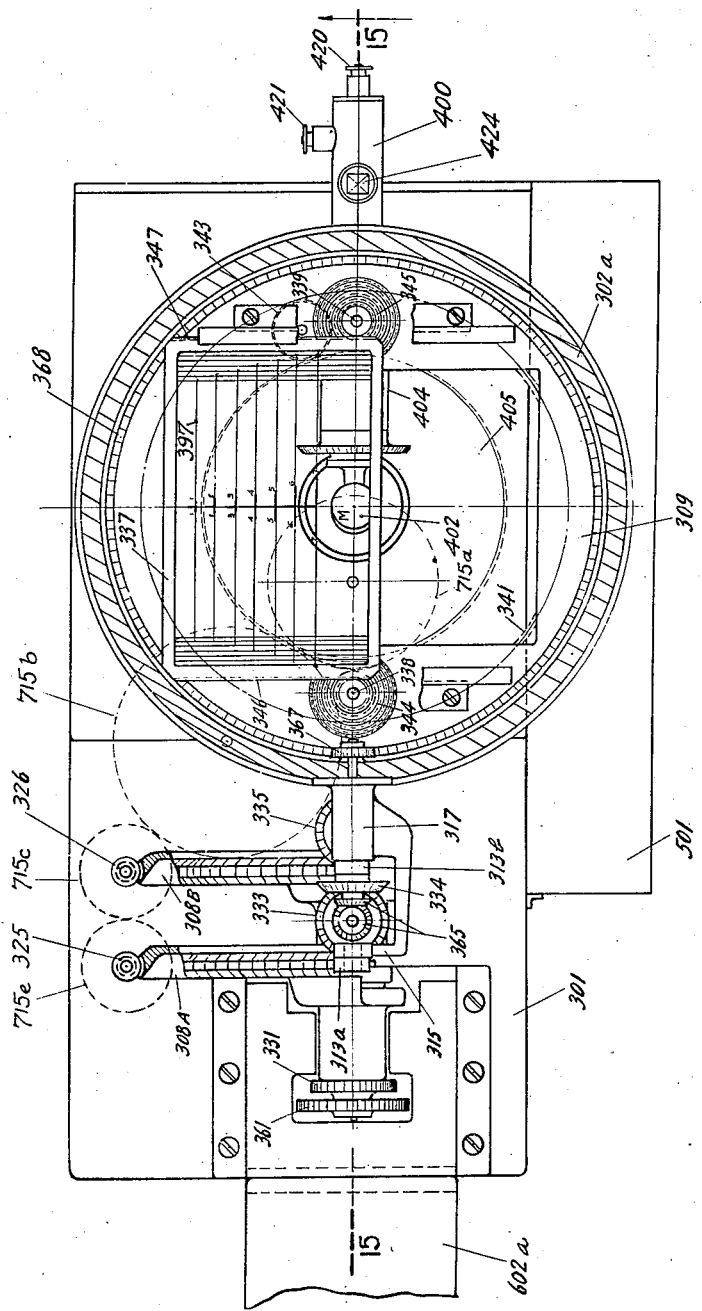

6 to 18 show, by way of illustration, the
iction of a practical fire director apparatus
ring the principles of operation and con-
on indicated in the diagrammatic views;

6 and 7 are side views of a gun mounting
ch the target-follower and aiming pointer
unted, Fig. 6 showing the target-follower
3. 7 the aiming pointer;

8 is an elevation of the gun mounting
it right angles to Figs. 6 and 7;

9 is a schematic view similar to Fig. 8 ex-
at the target-follower and aiming pointer
wn on a larger scale than the gun mount-
d the mechanical connections between the
ve parts of the target-follower, aiming
and gun mounting are shown diagram-
lly;

10 is a plan view of the target-follower;

11 is an elevation of the target-follower
ed on the line 11—11 of Fig. 10;

12 is an elevation looking in the direction
arrow 12 in Fig. 10 and showing the upper
the sight tube sectioned on the line 12—12
10;

13 is a diagrammatic elevation of the var-
speed power drive for the target-follower;

13a is an enlargement of part of the appa-
shown in Fig. 13;

14 is a plan view of the aiming pointer
ng the casing and showing the model-
sectioned on the line 14—14 of Fig. 15;

15 is an elevation of the aiming pointer
ied on the line 15—15 in Fig. 14;

15A is an end elevation of the upper part
aiming pointer;

16 is a plan view and Fig. 17 a sectional
ion of the telescope of the aiming pointer;

18 is an elevation of the computer with the
; removed;

19 is a diagram indicating the operation
complete apparatus; and s. 20A, 20B and 20C are views of the air-
to be fired on and the model airplanes as
through the telescope of the aiming pointer
ferent stages in the operations.

Principle of target-follower target-follower has a sight which is moved
power drive controlled by two manually
ble elements which also directly affect the
nent of the sight. The arrangement is such
one manually movable element controls the
ion and the other the speed of the move-
of the point in the sky towards which the
is directed. The first manually movable
nt is preferably made in the form of a
ng wheel and the second in the form of a
pedal. This enables the operator to control
movement of the point in the sky towards
a the follower is directed in precisely the
manner as the movement of an automobile
linarily controlled, thus making it easy for
operator to bring the point towards which
ollower is directed to a moving airplane and
ld it on the moving plane.
is type of movement is obtained by providing
separate means for inclining the sight. The
line extends between a slide on a horizontal
-table and a support spaced from the turn-
. Manual means are provided for moving the
on the turn-table and orienting the turn-
. Power means are provided for causing
relative movement between the turn-table and
the support to train and elevate a line between
the turn-table and the support.

The basic features of the simplest construc-
tion of the target-follower are illustrated in the
simplified diagrammatic perspective view, Fig. 1.
In this view, the sight line is indicated by a rod
103 carrying a sighting tube 104. The two sup-
ported points of the sight line are the point $Q_1$
and the point P.

The rear point $Q_1$ of the sight line is movable
along a radius $r$ of a horizontal turn-table 105.
This is indicated in Fig. 1 by showing the rear
point $Q_1$ of the rod 103 mounted by means of a
universal joint 106 on a block 107 sliding in a
radial groove in the turn-table. A control ele-
ment 108, preferably in the form of a steering
wheel, is arranged to turn the turn-table 105 so
as to vary the direction or bearing angle $\bar{a}$ of the
radius $r$. A control element 109, preferably in
the form of a foot pedal, is arranged to move
the rear point $Q_1$ along the radius $r$ so as to
vary its distance $e$ from the center Q of the turn-
table. (Strictly the point Q is a point on the axis
of the turn-table lying in the same horizontal
plane as the point $Q_1$.)

The other point P of the sight line whose move-
ment is controlled is at a fixed distance $d$ from
the center Q. This point is given training and
elevating movement. The means for training
and elevating the point P are indicated in Fig.
1 as a shaft 110 passing through the center of
the turn-table 105, a transverse rod 111 secured
to shaft 110 just above the turn-table (in the
horizontal plane of the points Q, $Q_1$), and a bent
arm 112 turnably mounted on the rod 111 and
having at its end a universal joint 113 in which
the upper part of the sight rod 103 is slidable.
Thus training movements may be given to the
point P by turning the shaft 110 independently
of the turn-table 105, and elevating movements
may be given to the point P by swinging the arm
112 about the rod 111.

The training and elevating movements of the
point P are produced mechanically by a power
drive 200 controlled by the steering wheel and
the pedal (which control also the position of the
point $Q_1$) in such manner that the relation be-
tween the training and elevating movements
given to the point P and the position given to the
rear point $Q_1$ responds to the following differen-
tial equations:

$$\frac{dg}{dt} = \frac{e.\sec s}{\Delta.d} \cdot \sin(g-\bar{a}) \quad (1)$$

$$2\frac{ds}{dt} = \frac{e.\sec s}{\Delta.d} \cdot \cos(g-\bar{a}) \sin 2s \quad (2)$$

where $$\frac{dg}{dt} \text{ and } \frac{ds}{dt}$$

are the speeds of the training and elevating move-
ments given to the point P, $g$ being the training
or bearing angle and $s$ the angle of elevation; $e$
is the distance between the points Q and $Q_1$, $\bar{a}$
is the bearing or direction angle of the radius $r$,
$d$ is the fixed distance QP, and $\Delta$ is a small con-
stant whose value is preferably about two
seconds.

As shown in Fig. 1, the power drive 200 has
control shafts 205, 206 connected respectively to
the pedal 109 and the steering wheel 108, an out-
put training shaft 207 connected to a training
gear 114 on the shaft 110 and an output elevating shaft 208 connected to an elevating gear 115 on the arm 112. A detailed description of the construction of the power drive 200, which makes the relation between the turning of its output shaft 207, and its control shafts 205, 206 comply with the equations above, is given at a later point in this specification.

The specified relation between the movements given to the point P and the position of the rear point $Q_1$ produces the following effects:

(1) The point P is moved in a plane containing the radius $r$ of the turn-table, and travels in a circle in this plane at an angular speed which is directly proportional to the sine of the angle between the line QP and the radius $r$ and also directly proportional to the distance $e$ between the rear point $Q_1$ of the sight line and the center Q of the turn-table. The steering wheel thus provides means for controlling the apparent direction of movement of the point on the sky towards which the sight line is directed, while the pedal provides means for controlling the speed of movement of this point, so that the point at which the sight line is directed may be quickly and easily guided into coincidence with a moving airplane by manipulations similar to those used in driving an automobile.

(2) When the sight line 103 is directed at an airplane $A_1$ flying at a constant speed and height on a fixed course, the steering wheel serves to adjust the sight laterally with respect to the moving airplane and after a few adjustments sets the turn-table so that its radius $r$ is exactly parallel to the course of the airplane, pointing in the opposite direction.

(3) When the steering wheel has been adjusted to set its radius $r$ parallel to the course of the airplane, the pedal adjusts the sight lengthwise along the course of the airplane, so that the sight line may be held on the plane by merely adjusting the pedal.

(4) When the steering wheel has been adjusted and the pedal is being manipulated to hold the sight line on the airplane, the position of the rear point $Q_1$ of the sight line gives the course of the airplane and its apparent speed. The course angle $a$ of the airplane differs by 180° from the bearing angle $\bar{a}$ of the radius $r$ of the turn-table. The speed of the airplane divided by its distance from the target-follower is proportional to the distance from the point $Q_1$ to the center Q divided by the distance from the point $Q_1$ to the point P. Expressed as an equation $$\frac{c_1}{D_1} = \frac{e}{d_1} \cdot \frac{1}{\Delta} \qquad (3)$$

where $c_1$ is the speed of the airplane $A_1$, $D_1$ is the distance to $A_1$, $e$ is the distance $Q_1$—Q, $d_1$, the distance $Q_1$—P, and $\Delta$ is a constant. The value $e$ may be indicated by the position of the pedal 109 and the value $d_1$ by the turning of a small gear 116 mounted on the universal joint 113 and engaging a rack 117 on the sight rod 103.

(5) When the sight line 103 is held on an airplane $A_1$ flying at a constant speed and height on a fixed course, the line QP from the center of the turn-table to the point P is directed at a point A which is close to the airplane and follows the airplane on its course at a speed, which after a few seconds, is equal to the speed of the airplane. Since the direction in which the line QP points is the result of the training and elevating movements given to the point P by the power drive controlled by the steering wheel and pedal, any other object, such as a gun, to which these mechanical training and elevating movements may be applied, will be automatically directed at the moving point A and, therefore, approximately toward the moving airplane.

As a result of these five effects, the target-follower may easily be set and held on a moving airplane and, when this is done, it indicates the course of the airplane and the speed of the airplane divided by its distance and produces mechanical training and elevating movements which may be used to direct a gun and another sight at a point following slightly behind the airplane at the same speed as the airplane.

This description of the principle of the target-follower will be concluded with a mathematical demonstration of the fact that the five specified effects follow from the relation between the movements given to the point P and the position of the point $Q_1$ specified in Equations 1 and 2, which for convenience in the demonstration are given in a slightly changed form as follows:

$$\frac{dg}{dt} = \frac{e}{\Delta \cdot d} \cdot \frac{\sin(g-\bar{a})}{\cos s} \qquad (4)$$

$$\frac{ds}{dt} = \frac{e}{\Delta \cdot d} \cdot \cos(g-\bar{a}) \cdot \sin s \qquad (5)$$

From these equations the movement given to the point P by the power drive 200 will be derived. Since the distance $d$ from Q to P is fixed, the point P necessarily moves on a spherical surface whose center is Q and whose radius is $d$. The intersections of this spherical surface with a horizontal plane passing through Q and an inclined plane containing the radius $r$ and the point P are shown in Fig. 1 as $P_1Z$ and PZ forming with the line $PP_1$ a spherical right triangle, one of whose angles $z$ is the dihedral angle between the horizontal plane and the inclined plane.

In the triangle $PP_1Z$ (or a similar larger spherical right triangle shown in Fig. 1 for greater clearness), $$\cot z = \cot s \cdot \sin(g-\bar{a}) \qquad (6)$$

Differentiating this equation gives $$-\frac{1}{\sin^2 z} \frac{dz}{dt} = \cot s \cdot \cos(g-\bar{a}) \frac{dg}{dt} - \sin(g-\bar{a}) \frac{1}{\sin^2 s} \frac{ds}{dt} \qquad (7)$$

Substituting in Equation 7 the values of $$\frac{dg}{dt} \text{ and } \frac{ds}{dt}$$

given by differential Equations 4 and 5, $$-\frac{1}{\sin^2 z} \frac{dz}{dt} =$$
$$\frac{e}{\Delta \cdot d} \left[ \frac{\cot s \cdot \cos(g-\bar{a}) \sin(g-\bar{a})}{\cos s} - \frac{\sin(g-\bar{a}) \cos(g-\bar{a})}{\sin s} \right] \qquad (8)$$

which reduces to $$\frac{dz}{dt} = 0 \qquad (9)$$

This demonstrates that the angle $z$ is constant, which shows that the movement of the point P is in a fixed plane containing the radius $r$ so long as the bearing angle $\bar{a}$ of the radius $r$ remains unchanged.

Since the point P moves on a spherical surface and in the plane $QPQ_1$, it necessarily moves in a circle in this plane. Its movement in this circle may be defined by the time derivative of the angle $\varphi$ between the line QP and the radius $r$ plane $QPQ_1$. In the spherical right triangle $PP_1Z$ $$\cos \varphi = \cos s \cos (g - \bar{a}) \quad (10)$$

[differ]entiating this equation gives $$\frac{d\varphi}{dt} = -\sin s \frac{ds}{dt} \cos (g - \bar{a}) - \cos s \sin (g - \bar{a}) \frac{dg}{dt} \quad (11)$$

[Substi]tuting in Equation 11 the values of $$\frac{dg}{dt} \text{ and } \frac{ds}{dt}$$

in Equations 4 and 5 and simplifying, $$\frac{d\varphi}{dt} = \frac{e}{\Delta.d} \sin \varphi \quad (12)$$

establishes that the rate of angular movement of the point P in the plane $QPQ_1$ is proportional to the sine of the angle between $QP$ and [the r]adius $r$, and that if $e$ is changed by moving the pedal 109, the rate of movement of the [point] P will be changed in direct proportion to $e$. [It] will now be assumed that at an instant of [time] $t_0$ the sight line 103 of the target-follower [has b]een directed as shown in Fig. 1 at an airplane $A_1$ flying at a constant height and a constant speed $c_1$ on a course whose direction is opposite to the direction in which the radius $r$ of [the t]urntable 105 is oriented; and that beginning at this instant $t_0$ the pedal 109 is adjusted to maintain the sight line 103 on the airplane. It is apparent from Equation 9 that the line $QP$ which intersects the track of the airplane at the instant $t_0$ will continue to intersect [the t]rack of the airplane. The speed at which [the p]oint of intersection A will travel along this [track] may be derived from Equation 12 and is $$c = \frac{eD}{\Delta.d} \quad (13)$$

[where] $eD$ is the distance from the intersection [point] A to the sight. It is evident from Fig. 1 [that] Equation 13 may be expressed in the form:

$$c = \frac{E}{\Delta} \quad (14)$$

[where] $E$ is the distance along the track of the [airpl]ane from the intersection point A to the airplane $A_1$. The rate of change in $E$ is obviously [the d]ifference between the instantaneous speed [of] the airplane $A_1$ and the instantaneous speed [of] the intersection point A, that is:

$$\frac{dE}{dt} = c_1 - c$$

$$= c_1 - \frac{E}{\Delta} \quad (15)$$

[Supp]osing $c_1$ to be a constant, the solution obtained by integrating this differential equation is:

$$E = (E_0 - c_1 \Delta) \epsilon^{-\frac{t-t_0}{\Delta}} + c_1 \Delta \quad (16)$$

[whe]re $E_0$ is the value of $E$ at the instant $t_0$ and $\epsilon$ [th]e natural logarithmic base 2.78 ... The [first] term of this equation may have a large value [at th]e instant $t_0$ when the operator starts to adjust the pedal and the distance $e$ to keep the [sigh]t line on the constantly moving airplane $A_1$; [but] since $\Delta$ is small the first term vanishes after [a fe]w seconds and the distance $E$ acquires the [cons]tant value:

$$E_1 = c_1 \Delta \quad (17)$$

[This] value, $E_1$, is small owing to the smallness [of $\Delta$], so that the line $QP$ is directed only a short distance behind the airplane $A_1$. As soon as $E$ has acquired this constant value, the speed $c$ of the intersection point A becomes constant and equal to the constant speed $c_1$ of the airplane $A_1$. It then follows from Equation 13 that:

$$c_1 = \frac{eD}{\Delta d} \quad (18)$$

As the triangles $QPQ_1$ and $APA_1$ are similar, $$\frac{D_1}{d_1}$$

may be substituted for $$\frac{D}{d}$$

in Equation 18, leading directly to Equation 3 given on page 3.

In the general case in which the radius $r$ of the turn-table has not been set parallel to the course of the airplane, the line $QP$ cannot intersect the track of the airplane. Fig. 2 shows a horizontal plane containing the track $A$—$A_1$ of the target and a point $A_0$ where the line $QP$ intersects this plane. Since the horizontal line $A_0A_1$ is parallel to $QQ_1$, the point $A_0$ will move along the line $A_0A_1$ at the speed $c$ given in Equations 13 and 14. To hold the sight line on the airplane $A_1$, the operator is now required to adjust the steering wheel 108 as well as the pedal 109, and, as he adjusts the steering wheel, the line of movement $A_0A_1$ of the point $A_0$ becomes parallel to the track $A$—$A_1$ of the airplane $A_1$ and the intersection point $A_0$ describes a curve similar to a curve of pursuit whose tangent at each instant passes through the position of the airplane $A_1$. The intersection point $A_0$, therefore, approaches the track of the airplane and after a few seconds merges into it as shown by the dotted line in Fig. 2.

*Principle of aiming pointer*

The aiming pointer consists essentially of a comparator sight whose line of sight is set and held at a small angle to an aiming axis with which the gun axis is kept parallel. The comparator sight contains a small model or picture of an airplane whose apparent size may be compared with the apparent size of the airplane to be fired on when the line of sight of the comparator is directed toward the airplane. In using the pointer, the aiming axis and also the gun axis are adjusted to direct the line of sight of the comparator toward the airplane so that the model is seen in line with the airplane. This adjusment is maintained until the real airplane appears the same size as the model and at this moment the gun is fired. The practicability of this simple device arises from the fact that the exact distance at which the airplane is to be fired upon is known in advance so that the deviation between the line of sight and the aiming axis necessary to point the aiming axis at the proper distances ahead of and above the airplane may be calculated and set in advance. Such calculation is facilitated by the fact that the aiming pointer reproduces on small scale the special relations of the course of the airplane and the trajectory of the shell.

The construction of the aiming pointer is indicated in the simplified diagrammatic perspective view, Fig. 3. This view shows a model-holder 300 consisting of a movable model-carrier plate 302 secured by hinged rods 303 to a horizontal turn-table 304 in such manner that the plate 302 is held horizontal. This mounting permits the plate 302 to revolve without rotation. The center of revolution is the point M on the supporting table 304. One point N of the carrier plate 302 is maintained at a fixed distance from the center of revolution M, while the distances from all other points of the plate to the point M vary. For this reason, the point N is termed the center of the movable model-carrier, although it need not be at the geometrical center nor at the center of gravity of the plate 302. The point N lies on the horizontal plane of the upper hinge pivots of the rods 303. The point M lies on the horizontal plane of the lower hinge pivots of the rods 303.

Manual means are provided for training and elevating the line MN. The training means include a hand wheel 305 connected to a training gear 306 for turning the turn-table 304. The elevating means include a hand wheel 307 connected to an elevating gear 308 secured to one of the rods 303. The line MN is the aiming axis; and the means for training and elevating this line are also connected so as to train and elevate the gun in such manner that the axis of the gun is always parallel to the line MN of the pointer.

A model-carrier ring 309 is mounted in the plate 302 so as to be turnable about a vertical axis passing through the point N. A model or picture 310 of an airplane is mounted in the ring 309. Fig. 3 does not show the means by which the model 310 is mounted, but indicates that it is in a horizontal plane and is directed toward the axis of the ring 309 along a radius $\bar{r}$ of the ring and is offset from the point N by a horizontal radial distance $\delta$ and a vertical distance $n$.

In order that a dimension of the model may be accurately compared with the corresponding dimension of a real airplane, the orientation of the ring 309 is constantly controlled so as to keep the axis of the model 310 always parallel to the direction of movement of the airplane to be hit. For this purpose, the ring 309 may be connected to the turn-table 105 of the target-follower 100, which, as before explained, is parallel and opposite to the course of the airplane on which the follower is directed, and this connection may be such that the radius $\bar{r}$ of the ring 309 is always parallel to the radius $r$ of the turn-table 105.

Optical means is provided for viewing the model 310 and the actual airplane from the point M. It is indicated in Fig. 3 as a telescope 400 including a mirror 402 so located that the viewpoint of the telescope is at the point M, and the optical axis of the telescope extends along the line MA₁ perpendicular to the axis of the telescope tube 403. The telescope tube is rotatably mounted in a bracket 404 on a disc 405 turnably mounted on the table 304 for rotation about a vertical axis line passing through the point M. The telescope with its mirror are turned about this axis and the axis of the telescope tube, either manually or mechanically, independently of the training and elevating movements of the holder 300 to direct the optical axis of the telescope on an airplane A₁ so as to bring an image of the actual airplane reflected by the mirror into the field of view of the telescope and to hold it in this field of view.

While the image of the actual airplane is in the field of view of the telescope 400, the training and elevation of the aiming axis MN are manually adjusted to direct the sight line of the comparator, that is, the line from the point M to the model 310, toward the airplane so that the model 310 is seen directly in line with the airplane through the telescope 400. The operator continues to adjust the training and elevation to keep the model in line with the airplane until the airplane and the model become identical in size, and, when this occurs, he fires the gun. At the moment of firing, the aiming axis and the gun axis are correctly positioned for firing, providing that the offsets $n$ and $\delta$ are such as to give the correct vertical and horizontal deviations between the comparator line of sight M—310 and the aiming axis MN with which the gun axis is parallel.

The offsets $\delta$ and $n$ are computed and the model airplane 310 is positioned in accordance with the results of the computation before the aiming sight is used. It is apparent from Fig. 3 that the aiming pointer reproduces on a small scale the actual space relations of the airplane and the projectile. A₁ is the point at which the airplane is viewed, A₂ the point of impact where the shell meets the airplane, and A₃ the point at which the gun must be aimed in order that the shell may reach A₂. In order that the aiming axis MN may be pointed at A₃ when the model airplane 310 is in line with an airplane at the point A₁, and appears of the same size as the real airplane, the model must be positioned so that the vertical offset $n$ and the horizontal offset $\delta$ represent the distances A₂A₃ and A₁A₂ on the scale of the model.

In guns of small and medium caliber, the distance A₂A₃ may be determined in close approximation from the distance MA₃ at the instant of firing, while the distance A₁A₂ may be similarly determined from the distance MA₃ and the speed of the airplane. Since the size of the enemy airplane and the size of the model 310 and the distance MN are known, the aiming pointer which has been described provides means for firing at the airplane when at a firing distance MA₃ which is known in advance. With this distance known in advance, it is a simple matter to compute the values of the distances A₂A₃ and A₁A₂ and to reproduce these distances on the scale of the model as the offsets $n$ and $\delta$.

In guns of small and medium caliber, close approximations to the distances A₂A₃ and A₁A₂ are as follows:

$$A_3A_2 = k_1 D_3^w \quad (19)$$

$$A_1A_2 = c_1 k_2 D_3^x \quad (20)$$

where $c_1$ is the speed of the airplane, $D_3$ is the distance MA₃ and $k_1$, $k_2$, $w$ and $x$ are constants derived from the ballistic curve of the gun. ($w$ is approximately equal to 2.6 and $x$ to 1.5 for a 37 mm. gun.)

From these relations, it follows that the vertical offset $n$ representing the distance A₃A₂ on the scale of the model airplane has a value given by the following equation:

$$n = \frac{u}{U} \cdot k_1 \left( b \frac{U}{u} \right)^w = k_1 u^{1-w} \cdot b^w \cdot U^{w-1} \quad (21)$$

where $u$ is a linear dimension of the model 310, $U$ is the corresponding dimension of the enemy airplane, $b$ is the distance MN, and $k_1$ and $w$ are the constants of the ballistic curve of the gun. The model airplane is accordingly set at this distance below the point N when the aiming pointer is constructed.

The value of the horizontal offset $\delta$, corresponding to the distance A₁A₂ on the scale of the model, is proportional to the speed of the airplane and is equal to the speed $c_1$ multiplied by a constant depending on the dimensions of the model and those of the real airplane and the distance $b$:

$$\delta = \frac{u}{U} \cdot k_2 \left( b \frac{U}{u} \right)^x \cdot c_1 = k_2 u^{1-x} b^x U^{x-1} \cdot c_1 \qquad (22)$$

The horizontal offset $\delta$ may be set at this value by using, in connection with the aiming pointer, any device for indicating the linear speed of an approaching target. A special feature of my invention consists in making use of the indications of the target-follower which has been described for setting the offset $\delta$.

The value of the speed $c_1$, as indicated by the target-follower appears from Equation 3:

$$c_1 = \frac{1}{\Delta} \cdot \frac{e}{d_1} \cdot D_1 \qquad (23)$$

and the distance $D_1$ of the airplane when the image of the model and the airplane appear the same size appears from Fig. 3:

$$D_1 = \frac{U}{u} \cdot b_1 \qquad (24)$$

where $b_1$ is the distance from the point M to the model 310 which is indicated by the position of the lenses of the telescope 400 when the telescope is focused on the model.

Introducing the value of the speed $c_1$ in Equation 22 gives a complete determination of the offset $\delta$:

$$\delta = k_2 u^{1-x} b^x U^{x-1} \cdot \frac{1}{\Delta} \cdot \frac{e}{d_1} \cdot \frac{U}{u} \cdot b_1$$

$$= \frac{k_3}{\Delta} u^{-x} b^x U^x \cdot \frac{e \cdot b_1}{d_1} \qquad (25)$$

The only variables in this expression are $e$, which is indicated by the position of the pedal 109, $d_1$, indicated by the pinion 116, and $b_1$ indicated by the adjustment of the lenses of the telescope 400.

Calculating apparatus 500 for computing the value given by this equation mechanically and instantly may be operated by connections to the pedal 109 and the pinion 116 of the target-follower and a connection to means for focusing the telescope 400, and used to set the model airplane 310 of the aiming pointer at the correct distance from the axis of the ring 309 automatically before the use of the aiming pointer.

A particularly valuable feature of the aiming pointer and the computer lies in the fact that, when designed in accordance with the above equations for use against a particular known enemy airplane of dimensions U, it may be made to give correct results when used against any other enemy airplane of known dimensions by merely adjusting the length $b$ of the rods 303 (for example, by means of the turn buckles 320) and making a small addition to the computer. Thus, if the difference in size between the enemy airplane against which the device is to be used and the enemy airplane for which the device was designed is represented by the factor S, it is necessary merely to change the length $b$ of the rods 303 by the factor $$S_b = S^{\frac{1}{W}-1} \qquad (26)$$

and to change the horizontal offset $\delta$ of the model 310 by the factor $$S_\delta = S^{\frac{X}{W}} \qquad (27)$$

The reason that this simple adjustment is sufficient is that changing U by the factor S and changing $b$ by the factor $S_b$ makes no change in the value of $n$ given in Equation 21 on page 5.

In a practical aiming pointer of the type described, a considerable number of model airplanes of different sizes are used so that the gun may be fired when the airplane is at a number of different predetermined distances within its range. Also, to permit use of the same models in firing upon enemy airplanes of different types, means are provided for adjusting the rods 303 and the computer in accordance with the sizes of different types of enemy airplanes.

*Principle of the fire director apparatus*

A fire director apparatus for guns of small and medium caliber, incorporating the target-follower 100 and the aiming pointer 300—400 is shown in Figs. 4 and 5. Fig. 4 contains a simplified perspective view of the basic constructional parts of the assembly, and Fig. 5 indicates diagrammatically the operative connections between them.

The gun mount includes the usual carriage 602 mounted for training movement about a vertical axis and the gun 600 mounted for elevating movement. The training gear of the carriage is indicated at 604 and the elevating gear of the gun at 603.

The target-follower 100 is mounted on a turntable 118 which is mounted on the gun carriage 602 for rotation about a vertical axis 119. The model-carrier 300 of the aiming pointer is mounted directly on the gun carriage 602, while the telescope 400 with its mirror is rotatably mounted in a bracket 404 on a disc 405 turnably mounted on the carriage 602.

In using the fire director, the target-follower 100 is moved by the steering wheel 108 and the pedal 109 to place and hold its sight line 103 on a moving airplane $A_1$. The training and elevating movements given to the point P of the follower in so doing are also given to the gun 600 and to the model-carrier 300 and telescope 400 of the aiming pointer. This keeps the axis of the gun 600, the aiming axis MN of the carrier 300 and the optical axis of the telescope 400 of the pointer parallel to the line QP of the follower, so that they are all directed at a point A slightly behind the airplane moving along the course of the airplane at the same speed as the airplane.

While the follower 100 is held on the airplane, the telescope 400 of the aiming pointer is manually adjusted by hand wheels 406, 407 to the slight extent necessary to direct its optical axis at the airplane $A_1$, instead of at the point A behind the airplane. Meanwhile the indications given by the target-follower are used to orient the model 310 to the course of the airplane and to offset the model horizontally in accordance with the speed of the airplane.

As soon as the external line of sight of the telescope 400 has been directed at the airplane, the training and elevating of the aiming axis MN and of the gun is altered by hand wheels 305, 307a to bring the model airplane 310 in line with the real airplane as seen through the telescope 400. The additional training and elevating movements thus given to the model-carrier 300 and to the gun are not given either to the target-follower 100 or to the telescope 400. Consequently, the sight line 103 of the target-follower 100 and the optical axis of the telescope 400 remain directed at the airplane $A_1$, while the aiming axis MN of the model-carrier 300 and the axis of the gun 600 are being directed toward the point A₃ ahead of the airplane and above the airplane by bringing the model 310 in line with the actual airplane. This is the position of the axes shown in Fig. 4. This condition is maintained until the actual airplane appears identical in size with the model airplane as seen from the point M through the telescope 400 and at that moment the gun is fired.

The operative connections between the various parts of the assembly which effect these operations are illustrated schematically in Fig. 5.

The training and elevating movements of the gun are derived from the power drive 200 which is controlled by the steering wheel 108 and the pedal 109, and from the hand wheels 305 and 307a which are manipulated during the use of the aiming pointer. To accomplish this, the training output shaft 207 of the power drive 200 has a mechanical connection 702 to one input shaft 703 of a differential 704 and the hand wheel 305 has a mechanical connection 705 to the other input shaft 707 of this differential. This differential adds together the movements of its two input shafts, and its output shaft 708a has a mechanical connection 708 to the gun carriage training gear 604. The elevating output shaft 208 of the power drive 200 has a mechanical connection 709 to one input shaft 710 of a differential 711 and the hand wheel 307a has a mechanical connection 712 to the other input shaft 713 of this differential. The differential adds together the movements of its input shafts, and its output shaft 714 has a mechanical connection 715 to the gun elevating gear 603.

The training and elevating movements given to the gun by the output shafts 207, 208 of the power drive 200 are given to the point P of the target-follower 100; but, in order that the target-follower may not be thrown off the target when the training and elevating of the gun is adjusted by means of the hand wheels 305, 307a, the training and elevating movements given to the gun by these hand wheels are not given to the target-follower. The target-follower receives the same training movement as the gun carriage 602 so long as the gun carriage is being trained only by the power drive 200 because under these circumstances the table 118 of the target-follower moves with the gun carriage 602 on which it is mounted; but means are provided for preventing the training movements given to the gun carriage 602 by the hand wheel 305 from affecting the table 118 of the target-follower. These means consist of a connection 716 between the hand wheel 305 and the table 118 including reversing gears 717, so that the hand wheel 305 gives to the table 118 a training movement equal and opposite to that which it gives to the gun carriage 602 on which the table 118 is mounted and thus does not affect the orientation of the table 118. The elevating output shaft 208 of the power drive 200 has a direct mechanical connection 718 to the elevating gear 115 of the target-follower. The connection 718 is at the input side of the differential 711 so that the elevating movements given to the point P of the target-follower are not affected by the elevating adjustment given to the gun by the hand wheel 307a.

The steering wheel 108 and the pedal 109 are connected to the control shafts 205, 206 of the power drive 200. The steering wheel and pedal also control the position of the rear point Q₁ of the sight line 103 of the follower. The pedal 109 has a mechanical connection 119 to the sliding block 107 on which the rear point Q₁ is mounted so as to slide it along the radius r of the turn-table 105. The steering wheel 108 is connected to the turn-table 105 to turn it about its axis. As, however, the turn-table 105 is mounted on the turn-table 118, the turn-table 105 would share the training movement of the turn-table 118 and would not be oriented solely by the steering wheel unless compensating means were provided. The compensating means include a differential 720, one of whose input shafts 721 has a mechanical connection 722 to the steering wheel 108 and the other of whose input shaft 723 has a mechanical connection 724 including reversing gears 725 to the training output shaft 207 of the power drive 200. The differential 720 adds the movements of its two input shafts, and its output shaft 726 has a mechanical connection 727 to the turn-table 105. The training movement which the training output shaft 207 of the power drive 200 gives to the table 105 is thus equal and opposite to the training movement which this shaft gives to the gun carriage 602 on which the tables 105, 118 are mounted. Consequently, the turning of the training shaft of the power drive causes no change in the orientation of the radius r of the turn-table and this orientation is determined solely by the movement introduced into the differential 720 by the steering wheel 108.

The model-holder 302 of the aiming pointer receives the same training and elevating movements as the gun 600. Being mounted directly on the gun carriage 602, the training movements given to the carriage are directly felt by it. The elevating gear 308 of the model-holder 300 has a direct mechanical connection 729 of the gun elevating gear 603.

The telescope 400 of the aiming pointer is given the same training and elevating movement as the point P of the target-follower but provision is made for adjusting its training and elevating by means of hand wheels 406 and 407. The training disc 405 receives the training movement given to the gun carriage 602 by the training output shaft 207 of the power drive 200 and is protected from the training movements given to the gun carriage by the hand wheel 305 in the same manner as is the turn-table 118 of the target-follower. A mechanical connection 730 branching from the mechanical connection 716 between the hand wheel 305 and the turn-table 118 is connected to one of the input shafts 731 of a differential 732 whose other input shaft 733 carries the hand wheel 406. The output shaft 734 of this differential has a mechanical connection 735 to the training disc 405 of the telescope. The elevating gear 408 of the telescope is connected to the elevating output shaft 208 of the power drive 200. A mechanical connection 736 extends from the elevating output shaft to one of the input shafts 737 of a differential 738 whose other input shaft carries the hand wheel 407. The output shaft 739 of this differential has a mechanical connection 740 to the telescope elevating gear 408.

To keep the ring 309 of the model-holder oriented with the course of the airplane, this ring is connected with the steering wheel 108 which orients the turn-table 105 of the target-follower. Compensating means are necessary to prevent the ring 309 from sharing the training movement of the gun carriage 602 on which the model-holder is directly mounted. Such compensating means include a differential 742 whose output shaft 743 has a mechanical connection 744 to the ring 309. One of the input shafts 745 of this differential 742 has a mechanical connection 746 from the steering wheel 108 and the other input shaft 747 has a mechanical connection 748 from the output shaft 708a of the differential 704 which trains the gun carriage 602. The connection 748 contains reversing gears 749. Thus, the training movements received by the model-holder from the gun carriage are not felt by the ring 309 and this ring is oriented solely by the steering wheel 108 so that its radius $\bar{r}$ is kept parallel to the radius $r$ of the turn-table 105 of the target-follower.

In order to set the model 310 at the correct radial distance $\delta$ from the axis of the ring 309, the pedal 109 and the pinion 116 of the target-follower and the focusing hand wheel 409 of the telescope 400 are connected to a computer 500 by mechanical connections 756, 757 and 752, and a connection 753 extends from the computer to the model 310. A hand wheel 510 to be set according to the size factor of the enemy plane under fire may also be connected to the computer 500 and to the turn buckles 320 of the model-holder 300 by mechanical connections 750 and 751 to make the adjustments necessary for the use of the device against enemy planes other than the particular one for which it was initially designed.

While I have found that the simplest arrangement for assembling the target-follower and aiming pointer with a gun is to mount them both directly on the rotary gun carriage, it is evident from the description already given that this is not essential in order to secure the operation which has been described in connection with Fig. 4. Thus the member 602 shown in Fig. 4 may be merely a rotatable table for carrying the instruments, and the training movements produced by the gear 604 and the elevating movements produced by the gear 308, or the training and elevation corrections produced by the hand wheels 305, 307a, may be transmitted by known remote control apparatus to train and elevate, or to correct the training and elevation of, one or more guns mounted independently of the table 602.

*Construction of fire director*

The principles of operation and the basic construction which I have described may be embodied in various different mechanical forms. To illustrate that which I consider the best mode of applying the principles of my invention, I will describe in detail a practical fire director apparatus embodying them and mounted on the carriage of a 37-millimeter anti-aircraft gun.

Figs. 6, 7 and 8 show the usual mounting of such a gun, which includes a gun carriage 602a mounted on a fixed support 601 for rotation about a fixed vertical axis, the gun 600 being mounted on the carriage for elevation about a horizontal axis. When the gun is to be used on land, the support 601 for the carriage is fixed on the ground, and, when the gun is to be used at sea, the support 601 is mounted on gimbals and positioned in known manner by means of a gyroscope so that it is held in fixed relation to the earth. My fire director is applicable to either form of mounting, as it may be mounted directly on the rotary gun carriage regardless of the manner in which the support 601 for the gun carriage is held in a fixed position.

Figs. 6, 7 and 8 show the arrangement of the parts of the fire director on the gun carriage. On the left-hand side of the carriage 602a of the gun 600a are mounted the target-follower 100 and a casing 201 containing the power drive 200. The steering wheel 108 and the foot pedal 109 which control the target-follower, and an additional foot pedal 209 hereinafter described, are connected to the casing 201 and placed in a convenient position for manipulation by an operator seated in a position where he can look through the sight tube 104a of the follower. A chair 605 carried by the gun carriage 602a is provided for this operator, and the pedals 109, 209 are placed on a platform 277 below this chair.

On the right-hand side of the gun carriage 602a is mounted the aiming pointer. The parts of the aiming pointer are contained in three casings 401, 301 and 501. The casing 401 has a lateral slot through which project two eye-pieces 410, 411 with which the telescope 400 is provided. The casing 301 below the casing 401 contains the mechanism associated with the telescope, and from this casing project the hand wheels 305, 307a which enable an operator observing through one of the eye-pieces of the telescope 400 to manually adjust the training and elevation of the gun 600. The hand wheels 406 and 407 which provide for adjustment of the telescope 400 independently of the gun also project from the casing 301 and are placed in position for operation by an operator observing through the other eye-piece of the telescope 400. The hand wheel 409a for adjusting the focus of the telescope projects from the casing 401 within reach of this operator. The casing 501 at one side of the casing 301 contains the computer 500 and from it project the hand wheel 508 and an operating hand wheel 510 hereinafter described.

The mechanical connections between parts mounted on opposite sides of the gun carriage 602a are contained in a tube 777 (Fig. 8) which extends across the gun carriage, and consist of nested hollow shafts within this tube. These connections are shown diagrammatically in Fig. 9 which is similar to Fig. 8 except that the size of the parts of the fire director and of the tube 777 are exaggerated for greater clarity. A detailed description of these mechanical connections, which are the same as those shown schematically in Fig. 5, will be given subsequent to a detailed description of the various parts of the fire director.

*Construction of target-follower*

A practical construction for the target-follower 100 is shown in Figs. 10, 11 and 12. These views show the front point P of the sight line at an elevation of 90°, and the rear point $Q_1$ of the sight line coincident with the center $Q$ so that the distance $e$ is equal to zero.

In the construction shown in Figs. 10, 11 and 12 the turn-table 118 of Fig. 4 takes the form of a plate 118a with a flange 118b and an arm 118c extending downwardly from one side of the plate 118a. The arm 118c is pivoted on a boss 12 (formed on the bottom of a gear casing 120 fixed to the casing 201) for a limited turning movement of the turntable which is sufficient to compensate for the training adjustment given to the gun carriage by the hand wheel 305. The turn table 105 of Figs. 1 and 4 has the form of a ring 105a rotatably mounted on the plate 118a about a circular opening in this plate by means of a ball bearing 122. The arm 112 of Figs. 1 and 4 takes the form of a frame 112a having a crosspiece 123 and side-pieces 124 carrying pivots 125 mounted on bearings 126 on the plate 118a. The sight rod 103 shown in Figs. 1 and 4 is omitted and the ends of the sight tube 104a are mounted like the ends of the sight rod 103 shown in Figs. 1 and 4.

In the mounting of the lower end of the sight tube, the sliding block 107 and its radial groove and the universal joint 106 of Figs. 1 and 4 are replaced by a tilting frame 106a, consisting of two tubes 127 and two cross bars 128, 129, pivotably mounted on pins 130, 131, carried by the ring 105a. The axes of the pins 130, 131 lie on a common diameter of the ring 105a, the left half of which corresponds to the radius $r$ of Figs. 1 and 4. Pivots 133 carried by the lower end of the sight tube 104 engage sleeves 134 which slide on the tubes 127 of the tilting frame to permit movement of the lower end of the sight rod along the radius $r$.

Figure 9:
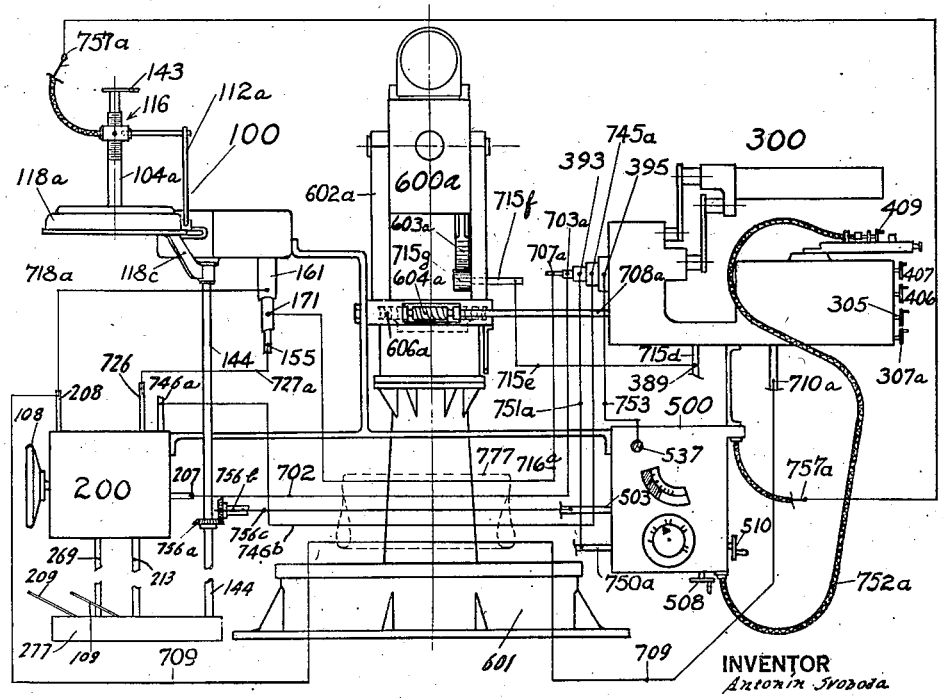

The mounting of the upper end of the sight tube is essentially like the mounting of the upper end of the sight rod 103 shown in Figs. 1 and 4. A circular rack 117a fixed to the sight tube 104a is slidably mounted in a bearing ring 136 supported by two pivots 137 carried by a yoke 138 whose center is pivotably mounted at the middle of the cross bar 123 of the frame 112a. The cylindrical rack engages a pinion 116a journalled in the bearing ring 136, and this pinion is connected by gearing 139 to a flexible shaft 757a which, as shown in Fig. 9, extends to the computer 500 to introduce the value $d_1$.

The sight tube 104 may be a low power telescope or simply an open tube. In either case, it is provided with cross hairs 141 and 142, one of which 141 lies in the same vertical plane with the radius $r$ of the ring 105a. An arrow 143 extending in the same direction as this cross hair is mounted on the tube to indicate to the operator the direction of movement on the sky of the point toward which the sighting line is directed.

The lower end of the sight tube 104 is moved along the radius $r$ by turning a shaft 144 which is connected to the pedal 109 in the manner hereinafter described. The shaft 144 is connected through gear 145, a compensating differential 146 and a double gear 147 to the external teeth of a gear annulus 148 journalled on the periphery of the ring 118a. The gear annulus 148 has crown teeth engaging a bevel gear 150 fixed on a bearing sleeve 135 journalled on the horizontal pin 130 carried by the ring 105a. A gear 151 also fixed on the bearing sleeve 135 engages two gears 152 fixed on shafts 153 journalled within the tubes 127. These shafts contain helical grooves engaging pins 154 carried by the sliding sleeves 134 so that, when these shafts are turned, they move the sliding sleeves 134 and the lower end of the sight tube 104 along the radius $r$. In order that the connecting mechanism which has been described may move the lower end of the sight tube proportionally to the turning movement of the shaft 144 without being affected by tilting movements of the frame 106a, the pin 130 is provided with a helical groove 177 of the same pitch as the helical grooves in the shafts 153, and the groove 177 is engaged by a screw 178 on the crosspiece 128 of the tilting frame 106a. When the frame is tilted, the movement of the gears 152 around the gear 151 turns the shafts 153 and displaces the sliding sleeves 134 with respect to the sleeves 127 of the tilting frame, but, at the same time, the engagement of the screw 178 with the groove 177 in the pin 130 displaces the tilting frame an equal distance in the opposite direction with the result that the position of the sliding sleeves 134 with respect to the ring 105a is not affected.

The ring 105a is turned to orient the radius $r$ by means of a shaft 155 which is connected through the differential 720 to the steering wheel 108 in the manner hereinafter described. The shaft 155 is connected by gear 156 to a compensating differential 157 which is connected by double gear 158 and gear 159 to an annular gear 160 formed on the outer periphery of the ring 105a.

The outer end of the sight tube 104a is elevated by means of a hollow shaft 161 connected to the elevating output shaft of the power drive 200 by means hereinafter described. The hollow shaft 161 rotates gear 162 meshing with double gear 163. Its movement passes through a compensating differential 164 to the double gear 165 meshing with a gear 166 (Fig. 12) which rotates a shaft 167, passing through the bearing 168 fixed to the plate 118a. The shaft 167 carries a worm 169 meshing with the worm gear 115a which is fixed to the frame 112a and so gives an elevating movement to this frame.

The turn-table 118a, 118b, 118c may be turned with respect to the gun carriage 602a by a hollow shaft 171 which carries a segment 172 meshing with a segment 173 coaxial with the boss 121 and fixed to the flange 118b by a screw 174. The movement of the hollow shaft 171 is introduced also into the compensating differential 157 (the segment 172 carrying the planet system of this differential) and into the compensating differential 164 through gears 175.

*Construction of power drive 200*

The construction of the power drive 200, which is controlled by the steering wheel 108 and the pedal 109 to turn the output shafts 207, 208 in accordance with Equations 1 and 2 given on page 2, is shown in Fig. 13. For convenience in construction, the differential 720 shown in Fig. 5 as outside the power drive is incorporated as a part of the power drive.

The power drive 200 has a fixed frame 202 mounted on the gun carriage 602a. This frame supports the casing 201 which is shown in Fig. 8 and omitted in Fig. 13, and also supports all the working parts of the drive. The casing is extended by a bracket 276 carrying a platform 277 in which the pedal 109 is mounted.

The training output shaft 207 is driven by a motor 280 but its turning is controlled by connection to a constant speed motor 204 through a friction drive 210 and a friction drive 211. The elevating output shaft 208 is driven by a motor 281 but its turning is controlled by connection to the constant speed motor 204 through the friction drive 210 and a friction drive 212. Following the terminology of Equations 1 and 2 on page 2, the rate of turning of the training output shaft 207 is designated $$\frac{dg}{dt}$$

and its turning movement as proportional to $g$;

and the rate of turning of the elevating output shaft 208 is designated $$\frac{ds}{dt}$$

and its turning movement as proportional to $s$. The control shafts of the power drive are the shaft 213 operated by the pedal 109 so that its turning movements are proportional to the distance $e$, and the shaft 214 operated by the steering wheel 108 so that its turning movements are proportional to $\bar{a}$. Since Equations 1 and 2 show both that $$\frac{dg}{dt} \text{ and } \frac{ds}{dt}$$

are functions of $g$ and $s$, as well as of $e$ and $\bar{a}$, it is apparent that the turning movements of the output shafts 207, 208, as well as the turning movements of the control shafts 213, 214, must be utilized to control the speed ratios of the friction drives 210, 211 and 212.

The friction drive 210 is controlled by the turning of the control shaft 213 and the turning of the elevating output shaft 208 in such manner that its speed ratio is equal to $e.\sec s$, so that its driven shaft 215 is given a rate of rotation proportional to $e.\sec s$. The mechanism for controlling the speed ratio of the friction drive 210 is as follows: The control shaft 213 operated by the pedal 109 through bevel gearing 216 carries a gear 217 meshing with a rack 218 on a slide 219, and the gear ratio is such that the displacement of this slide is equal to $e$. The elevating output shaft 208 through a worm 220 drives a gear 221 having a cam groove 222 engaged by a pin 223 carried on one arm 224 of an L-shaped lever 225 pivoted to the frame at 226. The turning movements given to the gear 221 are proportional to $s$. The cam groove 222 is so formed that the angle $i$ through which the arm 224 is turned from a line connecting the pivot 226 to the center of the gear 221 is related to the turning of the gear 221 by the equation:

$$\tan i = \text{const.} \sec s$$

The slide 219 and the lever 224 are connected to a slide 227 which controls the gear ratio of the friction drive 210 by sliding the friction wheel 228 splined on the output shaft 215 over the face of the disc 229 driven by the motor 204. The connection is made by means of a short shaft or roller 230 engaging a slot 231 in the slide 227 extending at right angles to its sliding movement, a slot in the arm 232 of the L-shaped lever 225 extending at right angles to its arm 224, and a slot 233 in the slide 219 extending at right angles to its sliding movement. As a result of this connection, the slide 227 is moved through a distance $w$ which is equal to $e.\tan i$, and therefore to const. $e.\sec s$. Consequently, the rate of rotation of the driven shaft 215 is proportional to $e.\sec s$.

The driven shaft 215 of the first friction drive 210 is connected through bevel gears 234 and worms 235, 236 to drive the friction discs 237, 238 of the other two friction drives 211, 212, so that each of these friction discs is driven at a rate proportional to $e.\sec s$.

The driven shaft 270 of the friction drive 211 is geared to the training output shaft 207. The connection between them includes double worm gearing 282, 283, 284, 285 connecting the driven shaft 270 to the shaft 286 of the motor 280 and bevel gears 259 connecting the motor shaft to the training output shaft 207.

The driven shaft 271 of the friction drive 212 is geared to the elevating output shaft 208. The connection between them is through double bevel gearing 272, 273, 274, 275 connecting the shaft 271 to the shaft 278 of the motor 281, bevel gearing 256, a shaft 287 and bevel gearing 288 connecting the motor shaft to the elevating output shaft 208.

The speed ratio of the friction drive 211 is controlled by turning movements of the control shaft 214 which is turned proportionately to $\bar{a}$ by the steering wheel 108 through a chain and sprocket connection 256', and the training output shaft 207 whose turning is proportional to $g$. The control shaft 214 is connected by bevel gears 239 to one input shaft 721 of the differential 720, while the other input shaft 723 of this differential is an extension of the motor shaft 286 which is connected to the output shaft 207 by the bevel gears 259. The differential effects a subtraction of the turning of the control shaft 214 from the turning of the output shaft 207, so that the output shaft 726 of the differential is driven proportionately to $g-\bar{a}$. A worm 240 on a shaft 726a connected to the shaft 726 by bevel gears 726b drives a gear 241 carrying a pin 242 at a distance $R$ from its center. The gear ratio is such that turning movements of the gear 241 are equal to $g-\bar{a}$. The pin 242 engages the slide 243 controlling the speed ratio of the friction drive 211 by moving the friction wheel 244 splined on the driven shaft 270 across the face of the friction disc 237. The distance between the friction wheel 244 and the center of the friction disc 237 is, therefore, equal to $R \sin(g-\bar{a})$, and this is the speed ratio of this friction drive. Since the rate of rotation of the driven shaft 270 is equal to the rate at which the driving disc 237 is driven by the shaft 215 multiplied by the speed ratio of the friction drive 211, the rate of turning of the driven shaft 270 and the rate of turning of the training output shaft 207 which is geared to the shaft 270 are proportional to $e.\sec s \sin(g-\bar{a})$ as required by Equation 1 on page 2.

The speed ratio of the friction drive 212 is controlled by the turning of the control shaft 214, the turning of the training output shaft 207 and the turning of the elevating output shaft 208. For this purpose, the slide 245 which determines the speed ratio by moving the friction wheel 246 splined on the driven shaft 271 is operated by a pin 247 carried by a gear 248 whose position is determined both by the turning of the control shaft 214 and the training output shaft 207 and by the turning of the elevating output shaft 208.

The position of the gear 248 is controlled by two independently mounted concentric worm gears 249 and 250.

The worm gear 249 is driven by a worm 251 on the shaft 726a, which, as has been said, turns proportionately to $g-\bar{a}$. The gear ratios are such that the turning movements of the worm gear 249, are equal to $g-\bar{a}$. The worm gear 249 carries an internally threaded gear segment 252 meshing with the gear wheel 248.

The worm gear 250 is driven by a worm 253 on the output shaft 254 of a differential 255, one of whose input shafts is driven by the shaft 726a turning proportionately to $g-\bar{a}$, and the other of whose input shafts is an extension of the motor shaft 278 which is connected to the elevating output shaft 208 by the bevel gearing previously described, so that it turns proportionately to $2s$. The differential 255 adds the movements of its two input shafts so that its output shaft turns proportionately to $g-\bar{a}+2s$, and the gear ratio is such that the turning movements of the worm gear 250 are equal to $g-\bar{a}+2s$. The gear 250 carries the pivot on which the gear 248 is mounted and therefore gives this gear a planetary movement about the common axis of the gears 249 and 250. The radius of the gear rack 252 is equal to R, as is also the diameter of the gear 248.

Since the turning movement of the gear 249 is equal to $g-\bar{a}$ and the turning movement of the gear 250 is equal to $g-\bar{a}+2s$, the relative movement of these two gears is equal to $2s$. From geometrical considerations, it is evident that the movement given to the slide 245 by the pin 247 as a result of the movement given to the gear 248 by the relative turning movements of the gears 249 and 250 is equal to $$R.\sin 2s.\cos(g-\bar{a})$$

This quantity is the speed ratio of the friction drive 212, since the slide 245 determines the distance of the friction wheel 246 from the center of the friction disc 238. As a result, the driven shaft 271 of the friction drive 212, on which the friction wheel 246 is splined, and the elevating output shaft 208 which is geared to the shaft 271 are driven at rates proportional to $$e.\sec s.\sin 2s \cos(g-\bar{a})$$

that is to say, proportional to the value of $$\frac{ds}{dt}$$

given by Equation 2.

There is no slippage in the friction drives 210, 211 and 212 because the energy for turning the output shafts 207 and 208 is not derived from the constant speed motor 204 through the friction drives, but from the two motors 280, 281 connected to the output shafts. These motors are compressed air motors or other motors which exert a torque which is more or less constant when the motors are still or are turning. Practically all the torque of the motors 280, 281 is exerted on the output shafts 207, 208 through the bevel gear connections which have been described, because the angle of the threads of the worms 282, 284, 272 and 274 is such that none, or at most only a small proportion, of the torque of the motor shafts is exerted on the driven shafts 270 and 271. The thread angle is about 9°. Thus the speeds of rotation of the output shafts 207 and 208 are determined by the constant speed motor 204 and the speed ratios of the friction drives, while the turning force of the output shafts is derived directly from the motors 280, 281.

In order that the motors 280 and 281 may always urge the output shafts 207 and 208 in the direction in which they would be turned by the motor 204 acting through the friction drives, the motors 280 and 281 are automatically reversed whenever the direction of the turning movement given to the output shafts 270, 271 by the friction drives changes. For this purpose, the motors 280, 281 are provided with reversing valves having arms 290, 291 controlled by solenoids 292, 293. When the solenoids are energized as shown in Fig. 13, they hold the arms 290, 291 in position to cause the motors 280, 281 to urge the output shafts 207, 208 to turn in one direction, and, when the solenoids are not energized, the arms are drawn by springs 294, 295 so as to reverse the motors and cause them to urge the output shafts to turn in the opposite direction. The energizing and de-energizing of the solenoid 292 is controlled by the making and breaking of contact between a brush 296 carried by the slide 243 and a fixed contact piece 297 positioned so that the brush contacts with it when the slide 243 positions the friction wheel 244 at one side of the axis of the friction disc 237 and is out of contact with it when the wheel is at the other side of this axis. As a result, the motor 280 is reversed whenever the friction wheel 244 crosses the axis of the friction disc 237 so that its direction of rotation is reversed. The solenoid 293 for reversing the motor 281 is similarly controlled by a brush 298 on the slide 245 cooperating with a fixed contact piece 299.

In addition to the parts which have been described, Fig. 13 shows a pedal 209 which may be used to move the slide 219 instead of using the pedal 109. The provision of the pedal 209 is not essential to the operation of the target-follower, but it has the advantage of facilitating the work of holding the sight tube of the target-follower on the target after the sight tube has been directed at the target by use of the steering wheel 108 and the pedal 109.

When an airplane is approaching from a considerable distance on the course directed at or nearly at the target-follower, it is necessary for the operator to allow the pedal 109 to keep moving upward in order to keep the sight tube 104a on the target. The reason for this will be seen by reference to Equation 3 on page 3. Under the circumstances described, $c_1$ will be constant while $D_1$ will be decreasing. It follows that $e$ must be increased continually by allowing the pedal 109 to rise in order to maintain the equality specified in Equation 3 which is necessary to keep the sight tube on the target. The necessity for this manipulation of the pedal 109 may be avoided by use of the pedal 209.

The pedal 209 is mounted on the platform 277 and connected by linkage 269 to a gear quadrant 260 meshing with a gear 261 to which is fixed a smaller gear 262. A worm gear quadrant 263 is fixed to the frame 202 on the same axis as the pinion 262 and gear 261. A rack 264 is slidably mounted on the quadrant 263 and engages the gear 262. At the end of the rack 264 is a bearing 265 engaging a bracket 266 on the slide 219. A line from the bearing point of the bearing 265 to the axis of the quadrant 263 is parallel to the direction of the sliding movement of the rack 264.

The quadrant 263 is turned about its axis by a worm 258 on the elevating output shaft 208. The turning movement of this output shaft, as previously stated, is proportional to $s$, the elevation angle given to the point P of the target-follower. The gear ratio of the connection between this shaft and the quadrant 263 is such that the angle $j$ between the rack 264 and the bracket 266 is always equal to $s$.

If the pedal 209 is held stationary and the pedal 109 is released so that its return spring 269 holds the bracket 266 of the slide 219 against the bearing 265 of the rack 264, the slide 219 and the gear 217 will be moved by the turning of the quadrant 263. From geometric considerations, it is evident that the movement thus given to slide 219 is equal to $f \sin j$ or $f \sin s$ where $f$ is the distance between the bearing 265 and the pivot of the quadrant 263 which is determined by the position of the pedal 209. It is evident from Figs. 1 and 19 that $$D=\frac{h}{\sin s}$$

where $h$ is the height of the airplane. By substituting this value for D in Equation 18 on page 5

$$e=c_1\Delta d\,\frac{\sin s}{h}$$

In the usual case where the speed and height of the airplane are constant, this reduces to $$e=K.\sin s$$

In this case, the slide 219 may be moved in accordance with the value of $e$ by merely holding the pedal 209 stationary in a position which makes the extension $f$ of the rack 264 equal to the constant K. Consequently, the target-follower may be held on an airplane approaching at a constant speed and height by releasing the pedal 109 and holding the pedal 209 stationary. Where there are changes in the speed or height of the target, as for example when the target is diving or coming out of a dive, adjustments of the pedal 209 are of course required, but these are less than the continual adjustment of the pedal 109 which is necessary to maintain the target-follower on an approaching airplane.

Construction of aiming pointer

The construction of the aiming pointer is shown in Figs. 14, 15 and 15A, which show the pointer with its aiming axis MN directed towards the zenith.

The aiming pointer has a frame 301 which is fixed on the gun carriage 602a.

The model-holder 300 has a hollow circular casing 302a corresponding to the plate 302 of Figs. 3 and 4. The casing 302a is mounted on the frame 301 by means which, like the hinged rods 303 of Figs. 3 and 4, permit it to revolve without rotation so that its center point N moves in a circular arc about the point M of the frame 301, while the distances from its other points to the point M vary. The hinges at the lower ends of the rods 303 and the elevating gear 308 of Figs. 3 and 4 are replaced by two worm gear quadrants 308a, 308b, whose hubs are journalled on bosses 323, 324 formed on the frame 301. The quadrant 308a carries a pair of bearings 319 in which is rotatably mounted a long nut 320a corresponding to one of the turn buckles 320 of Figs. 3 and 4. A similar nut 320b is mounted on similar bearings 321 carried by the quadrant 308b. Screwed into the nuts 320a and 320b are threaded rods or screws 303a, 303b corresponding to the rods 303 of Figs. 3 and 4. The hinges at the upper ends of the rods 303 of Figs. 3 and 4 are replaced by forks 313, 314 journalled on the upper ends of the threaded rods 303a, 303b, a bracket 317 and a projection 318 fixed to the casing 302a, a pivot pin 311 connecting one arm 313a of the fork 313 to an arm 315 of the bracket 317, a hollow stud 316 on the bracket 317 pivoted in the other arm 313b of the fork 313, a pivot pin 312 connecting one arm 314a of the fork 314 to an arm 321 of the bracket 317, and a hollow stud 322 on the projection 318 pivoted in the other arm 314b of the fork 314. The axes of the pin 311 and the hollow stud 316, on the one hand, and the axes of the pin 312 and the hollow stud 322, on the other hand, are located on two parallel horizontal lines 311a, 312a located in the same vertical plane and separated by the same vertical distance as the axes of the bosses 323, 324 on which the quadrants 308a, 308b are journalled.

The elevation of the model-holder may be changed by giving the gear segments 308a, 308b equal angular movements about their bearings. This is accomplished by turning shaft 389 carrying a worm 326 engaging the gear segment 308b and connected by gears 115c, 115e to a shaft 390 carrying a worm 325 threaded in the opposite direction from the worm 326 and engaging the gear segment 308a.

The effective length of the threaded rods 303a, 303b may be changed by turning hollow shaft 393 which carries a gear 394 engaging a gear 332 fixed on a hollow shaft 329 journalled within the boss 324. The gear 332 engages a gear 331 fixed on a hollow shaft 330 journalled within the boss 323 so that when the hollow shaft 393 is turned, the hollow shafts 329 and 330 are turned at equal amounts in opposite directions. These hollow shafts are connected by bevel gearing 327, 328 to the nuts 320a, 320b. The nuts are threaded in opposite directions so that the turning movements thus imparted to them cause equal longitudinal movements of the threaded rods 303a, 303b, because the rods themselves are held against turning by bevel gears 333, 335 fixed on the threaded rods and engaging bevel gears 334, 336 fixed on the bosses 317, 318 of the circular casing 302a. These bevel gears counteract the effect of the bevel gears 327, 328 in such manner that changes in the elevation of the model-holder cause no change in the effective lengths of the threaded rods 303a and 303b.

A flat ring 309a for carrying model airplanes is rotatably mounted in the circular casing 302a near the bottom of the casing. The single model 310 shown in Figs. 10 and 11 is replaced by a plurality of models 1 to 7. The models increase progressively in size from 1 to 7. The models are mounted in a set of superimposed frames 337 resting on the ring 309a. Each model is held in its frame by taut wires 397 shown in Fig. 14. The depth at which the ring 309a is mounted in the circular casing 302a and the thickness of the frames 337 determine the vertical offset $n$ of each model from the point N. It will be noticed that in accordance with Equation 21 on page 5, the vertical offset is greatest in the case of the smallest model.

The models 1 to 7 are merely small scale measures of the wing spread and length of a particular enemy airplane, and may have the form of T's, as shown.

The horizontal offsets $\delta$ of the models 1 to 7 may be varied by turning vertical shafts 338, 339 journalled on the ring 309a equally in opposite directions. Each of these shafts carries a series of gears 344, 345 of different diameters which engage racks 346, 347 formed on the external edges of the side bars of the frames 337. When the shafts 338, 339 with their gears 344, 345 are turned equally in opposite directions, the frames 337 are displaced along a diameter of the casing 302a and ring 309a. In this operation, the models 1 to 7 are moved through different distances related in accordance with the diameters of the different gears on the shafts 338, 339. The relations between the diameters of the gears and the size of the model airplanes is hereinafter specified in connection with a description of the computer 500.

A gear annulus 341 is rotatably mounted in the casing 302a just below the ring 309a. This annulus has a set of internal gear teeth engaging a gear 340 on the shaft 338 and a reversing gear 343 engaging a gear 342 on the shaft 339. When the gear annulus 341 is turned relatively to the ring 309a, the horizontal offsets δ of the models are changed by the turning of the shafts 338, 339. When, on the other hand, the gear annulus 341 and the ring 309a are turned simultaneously and equally, the orientation of the models is changed without changing their offsets.

The ring 309a is connected to a shaft 362 journalled inside the hollow shaft 330 in the boss 323 of the frame and the gear annulus 341 is connected to a shaft 355 journalled in the hollow shaft 329 in the boss 324 of the frame. The connection between the shaft 362 and the ring 309a includes bevel gears 363, a shaft 364 journalled within the threaded shaft 303a, bevel gears 365, the shaft 366, a bevel gear 367 and bevel gear teeth 368 formed on the peripheral portion of the ring 309a. The connection between the shaft 355 and the gear annulus 341 is similar and includes bevel gears 356, shaft 357, bevel gears 358, shaft 359, bevel gear 360 and bevel gear teeth 349 formed on the peripheral part of the gear annulus 341.

In order to change the offset δ of the models without changing the orientation of the models, it is necessary to turn the shaft 355 without turning the shaft 362. This is accomplished by turning the hollow shaft 395 which carries a gear 396 meshing with the sun gear of the differential 353, one of whose planet gears is held against rotation by engagement with a double gear 352, while the other planet gear engages a gear 354 fixed on the shaft 355 and turns this shaft.

To change the orientation of the models without changing their offsets, it is necessary to turn both the shafts 362 and 355 simultaneously and equally. This is accomplished by the turning of the output gear 743a of the differential 742 which meshes with the double gear 352 freely journalled on the shaft 355 and engaging a gear 361 fixed on the shaft 362 and engaging also one of the planet gears of the differential 353. As the sun gear of the differential 353 is held stationary by the shaft 395, the turning of the double gear 352 results in giving equal turning movements to the two shafts 362 and 355.

As shown in Fig. 15, the telescope 400 of the aiming pointer is mounted in substantially the same way as shown in Fig. 4, that is to say, the tube of the telescope is held in a bracket 404 mounted on a disc 405 rotatably mounted on the frame 301 fixed to the gun carriage 602a. The construction of the telescope itself is, however, more complicated than the simple form shown in Figs. 3 and 4 in order to show in sharp focus both a real airplane at a considerable distance and a model airplane at a short distance. Furthermore, the telescope is provided with two eye-pieces so that it may be pointed and focused by one operator, while another operator uses it to bring one of the model airplanes into coincidence with the real airplane. The actual construction appears in Figs. 14, 15, 16 and 17.

The telescope 400 is provided with two eye-pieces, one of which, 420, is coaxial with the telescope tube, and the other of which, 421, is at right angles to the axis of the tube and receives light through a mirror 422 extending half way across the tube. The telescope is provided with two parallel receiving mirrors, one of which, 402, located at the point M receives the rays from the model airplanes, and the other of which, 423, receives the rays from the real airplane. Rays from the real airplane pass through reversing prisms 424 and after striking the mirror 423 pass through an object lens 425 and then to the two eye-pieces. The image seen in the eye-pieces may be focused by movement of the eye-pieces in the usual manner. The rays from the model airplanes striking the mirror 402 pass through a lens 426 fixed in the telescope tube and then through a lens 427 slidably mounted in the telescope tube, and then through the object lens 425 and to the two eye-pieces. The constants of the optical system are so chosen that the visual angle of the model measured from M equals the corresponding visual angle after passing through the lenses 426 and 427 and so that the rays from the model become parallel by the combined effect of the lenses 426 and 427. This result can be obtained in several ways. As illustrated in Fig. 17, for example, the lenses 426 and 427 can both be of the same focal length F. The point M, which is located on the reflecting surface of the mirror 402, coincides with the front focus of the lens 426. The first image of the model is formed at a point N* at a distance Σ from the rear focus of the lens 426. Lens 427 is adjusted so that its front focus is at the point N*. This results in making the image of the model appear sharp in the eye-pieces at the same time that the image of the airplane appears sharp in the eye-pieces, and thus enables the making of an accurate comparison between the two images. As the distance $b_1$ from the point M to the miniature model changes with the changes in the elevation angle of the model holder, the position of the lens 427 must be adjusted in order to keep its front focus at the point N* which changes its distance from the rear focus of the lens 426 with changes in the distance from the point M of the model. Fig. 15 shows means for making this adjustment consisting of a hand wheel 409 fixed on a threaded shaft 413 mounted on the tube of the telescope and serving to displace a nut 414 connected to the mounting of the lens 427 by a pin 415. The turning of the hand wheel 409 to focus the model is a reciprocal measure of the distance $b_1$ from M to the model in focus and is transmitted to the computer 500 by a flexible shaft 752a.

*Construction of computer*

The computer 500 in cooperation with the gears 344, 345 of the model-carrier determines the value of δ in accordance with Equation 25 on page 6 and multiplies the result by the factor Sδ given on page 6, so as to set the horizontal offset of a model airplane having a dimension $u$ required to hit not only the known enemy airplane of dimension U, but any known enemy airplane having a dimension $S.U$. For convenience in construction, the required offset is determined by the product of the following five factors:

$$\frac{k_2}{\Delta} \cdot e$$

$$u^{1-n} \cdot U^n$$
$$u^{-1}$$
$$d_1^{-1}$$
$$b_1$$

whose product is δ (see Equation 25 on page 6) and the size factor Sδ.

The computer 500 shown in Fig. 18 has a frame 502 fixed on the frame 301 of the aiming pointer. An input shaft 503 journalled on the frame 502 is connected to the pedal 109 so that its rotations are proportional to $e$. A worm 504 on this shaft es with a worm gear 505 also journalled on rame 502 so that the gear 505 also turns oportion to $e$. Another worm gear 506 is alled on the frame 502 in front of the worm 505, and to the worm gear 506 is attached l 507 overlying the face of the worm gear The dial 507 may be turned by a hand wheel n a shaft 509 on which is splined a worm agaging the worm 506.

the face of the worm gear 505 is traced ve 512 such that the arc of a circle meason the circumference of the dial 507 between joint 513 fixed with respect to the frame nd the point of intersection 514 of the curve ith the circumference of the dial 507 equals $$\log \frac{k_2}{\Delta} \cdot e$$

conveniently chosen scale. This can easily ne since $e$ is the only variable in this factor he worm gear 505 is turned proportionately the dial 507 are a series of graduations ered from 1 to 7. The length of the arc ired from the zero point 515 of the circumce of the dial to each graduation of the is equal to the value $\log u^{-1}$ for one of the models, 1-7. Since $$\log u^{-1} = -\log u$$

rc terminating at the graduation 6, for ex-, is equal to the minus logarithm of a dimenof the model 6, and the other graduations imilarly related to the corresponding diion of the other models 1-5 and 7. It folthat the turning movement of the dial 507 he worm gear 506 required to bring the dial rom its zero position to the point where one e graduations, for example, the gradua-, intersects the curve 512 is proportional to $$\log \frac{k_2}{\Delta} e + \log u^{-1}$$

$u$ is a dimension of the model 6.
other factors are introduced by moveof a pin 516 fixed on a block 520 slidable rod 518 fixed to the frame 502. On the 18 are four other sliding blocks 521, 522, 523, onnected to the block 520 by a linkage such the movement given to the block 520 by liding blocks 521, 523 and 524 is equal to the movement of the block 521 plus the nent of the block 523 less half the moveof the block 524.
block 521 is moved by a cam 525 conl through gearing to the flexible shaft 757a cted to the gear 116 of the target-follower movements are a measure of the distance .he cam 525 is so arranged that the movegiven to the block is equal to $2 \log d_1^{-1}$, s to say, to $-2 \log d_1$.
slide 523 is moved by a cam 526 on a shaft onnected to the flexible shaft 752a which, fore explained and as shown in Fig. 15, ned by the hand wheel 409 in adjusting ns 427 of the telescope 400 to bring one model airplanes into sharp focus, so that rning movement is a reciprocal measure distance $b_1$. The groove in the cam 526 formed as to shift the block 523 through a ice proportional to the minus logarithm of urning movement of the shaft 752a and to $\log b_1$.
slide 524 is moved by the hand wheel 510 ., as before stated. is set to adjust the device for firing upon an enemy plane of dimensions different from the dimensions U of the particular type of enemy plane for which the device was designed. To facilitate setting the hand wheel 510, the shaft 750a on which the hand wheel is mounted is connected by a worm 519 to a pointer 528 moving over a dial 529 on which are marked the size factors from all known types of enemy airplanes. One mark bears the name of the type of enemy plane for which the device was designed, that is, the type for which the size factor S is equal to 1. Each other known type of enemy plane is represented on the dial by two marks one of which, in black, represents the size factor of the length of the plane and the other, in red, represents the size factor of the wing spread of the plane.

In order to make possible the use of a direct connection 751a between the shaft 750a and the shaft 393 which adjusts the distance $b$ by varying the effective length of the rods 303a, 303b (Fig. 15), each graduation on the scale 529 for a size factor S of an enemy airplane is separated from the zero position by an angular distance proportional to $$S^{\frac{1}{W}-1}$$

so that, in setting the hand wheel 510 to a size fact r for a particular enemy plane, the shaft 750a is turned proportionately to $S_b$. (See Equation 26 on page 6.)

The slide 524 is moved by the shaft 750a through a cam 530 which is designed to transform angular movement equal to $$S^{\frac{1}{W}-1}$$

into linear movements equal to $$-2 \cdot \frac{x}{w} \cdot \log S$$

so that the movement given to the slide 524 is equal to $-2 \log S_i$. (See Equations 26 and 27 on page 6.)

Since the slide 521 is moved proportionately to $-2 \log d_1$, the slide 523 proportionately to $\log b_1$ and the slide 524 proportionately to $-2 \log S_i$. the slide 520 and the pin 516 are moved proportionately to $$\log \frac{d_1^{-1}}{\Delta} e + \log b_1 + \log S_i$$

and the worm 511 is slid along the shaft 509 by this distance. After this has occurred, the hand wheel 508 is turned to bring one of the graduations on the dial 507 in line with the curve 512. In doing this, the hand wheel 508 must be turned by the amount which would have been necessary to position the graduation if the worm 511 had not been slid on the shaft 509 plus an amount corresponding to the distance through which the worm has been moved along the shaft 509, so that the turning movement given to the hand wheel 508 and to its shaft 509 is proportional to $$\log \frac{k_2}{\Delta} \cdot e + \log u^{-1} + \log d_1^{-1} + \log b_1 + \log S_i$$

This turning movement of the shaft 509 is transferred through worm 531 and worm gear 532 to an anti-logarithmical cam 533, so that a slide rod 534 engaging this cam is moved through a linear distance equal to $$\frac{k_2}{\Delta} \cdot e \cdot u^{-1} \cdot d_1^{-1} \cdot b_1 \cdot S_i$$

A rack 535 on the slide rod 534 engages a gear 536 on a shaft 537 having a connection 753 (Fig.

9) to the hollow shaft 395 (Fig. 15), which is connected to the gears 344, 345 of the model-holder 300 as previously explained. Each of the gears 344, 345 (Figs. 14, 15) is accordingly turned through an angle proportional to the aforesaid linear distance. The radius of each of the gears 344, 345 is made equal to the value of $u^{1-x}U^x$ corresponding to the linear dimension $u$ of the particular one of the models 1–7 which it moves. Consequently, the movement given to the gears 344, 345 by the predictor results in moving each of the frames 337 so as to offset each one of the models 1–7 from the axis of the model-carrier 309a by the distance $$u^{1-x}U^x \cdot \frac{k_2}{\Delta} e u^{-1} d_1^{-1} b_1 . S_b$$

which is equal to $$S_b \cdot \frac{k_2}{\Delta} u^{-x} U^x \cdot \frac{e_* b_1}{d_1}$$

which is the required offset $S_b$. $\delta$ for each model (see Equations 25 and 27 on page 6 respectively).

*Mechanical connections*

The mechanical connections shown schematically in Fig. 5 and described on pages 6 to 8 ante are shown in the detailed views as follows:

The connections for training the gun are shown in Figs. 9 and 15. The differential 704 is shown in Fig. 15 and its output gear 370 meshes with a gear 371 on the shaft 708a. This shaft 708a, as shown in Fig. 9, turns the gun-carriage training worm 604a which, as shown in Figs. 6, 7 and 9, causes training movements of the gun-carriage 602a by engagement with a fixed worm gear 606a. One input shaft of the differential 704, namely, the hollow shaft 703a shown in Figs. 9 and 15, is connected to the training output shaft 207 of the power drive 200 by a connection 702 passing through the tube 777 and diagrammatically indicated in Fig. 9. The other input shaft of the differential 704, the shaft 707a shown in Fig. 15, has the training hand wheel 305 mounted directly upon it.

The connections for elevating the gun are also shown in Figs. 9 and 15. The differential 711 is shown in Fig. 15. Its output shaft, the hollow shaft 714a, is connected through gears 715a, 715b, 715c to a shaft 715d having a mechanical connection 715e indicated in Fig. 9 to a shaft 715f carrying a gear 715g engaging the gun-elevating gear rack 603a, as shown in Figs. 8 and 9. One input shaft 710a of the differential 711 has a mechanical connection 709 passing through the tube 777 and shown diagrammatically in Fig. 9 with the elevating output shaft 208 of the power drive 200. The other input of the differential 711 is the gear 713a shown in Fig. 15 with which the elevating hand wheel 307a is connected by a shaft 712a.

The connections for training and elevating the target-follower are shown in Figs. 9, 11, 15. The connection between the training hand wheel 305 and the table 118a of the target-follower extends from the shaft 707a on which the hand wheel 305 is mounted (Fig. 15) to the hollow shaft 171 shown in Fig. 11 and connected to turn the table 118a as previously explained. This connection extends through the tube 777 and is diagrammatically shown in Fig. 9 as 716a. The reversing gears 717 shown in Fig. 5 are replaced by the gear segments 172, 173 shown in Fig. 11. The connection between the elevating output shaft 208 of the power drive 200 and the elevating gear 115a of the target-follower is indicated diagrammatically in Fig. 9 as a connection 718a from the elevating output shaft to the hollow shaft 161 which is shown in Fig. 11 and which, as has been explained, operates the elevating gear 115a.

The connection from the pedal 109 to the target-follower is shown in Figs. 9, 11 and 13. The shaft 144 of the target-follower shown in Fig. 11 extends down into the platform 277 as shown in Figs. 8 and 9 and is connected by bevel gears 719a, 719b in the platform with the pedal 109 as shown in Fig. 13. The shaft 144, as previously explained in connection with Fig. 11, is connected to move the lower end of the sighting tube 104a along the radius $r$ of the turn-table 105a.

The connection from the steering wheel to the target-follower is shown in Figs. 9, 11 and 13. The connection between the steering wheel and the differential 720 is shown in Fig. 13 and has been described. The output shaft 726 of the differential 720 has a mechanical connection 727a shown diagrammatically in Fig. 9 to the shaft 155 of the target-follower which is shown in Fig. 11 and which serves to rotate the turn-table 105a as has been explained in connection with Fig. 11.

The connection between the elevating gears of the model-holder 302 and the gun is shown in Fig. 15. The model-holder elevating shaft 389, which as already explained operates the elevating segments 308a, 308b of the model-holder, is directly connected to the shaft 715d, which as already explained is connected to the gun elevating gear 603a.

The mechanism for adjusting the training of the telescope by means of the hand wheel 406 is shown in Fig. 15. The hand wheel 406 is mounted directly on one of the input shafts 733 of the differential 732, while the other input shaft 731a of this differential is connected by gears 373 to the shaft 707a, which as already explained forms a part of the connection between the hand wheel 305 and the turn-table 118 of the target-follower. The output shaft 734a of the differential 732 carries a gear 377 meshing with teeth on the periphery of the telescope-training disc 405.

The connections for elevating the telescope 400 are also shown in Fig. 15. The elevating gear 408a of the telescope is connected to the shaft 736a which is directly connected to the shaft 710a whose connection to the elevating output shaft of the power drive has already been described. The elevating gear 408a is also connected to the hand wheel 407. The differential 738, through which these connections were made in the diagram Fig. 5, is replaced in the construction shown in Fig. 15 by two differentials 738a, 738b which serve to add together the movements of the hand wheel 407 and the shaft 736a and serve also to compensate for the training movements of the disc 405 so that these do not affect the elevation. The input shaft 383 of the differential 738b is connected by gearing 384 to the shaft 736a, while its output shaft 382 extends through the training disc 405 and carries a bevel gear 385 meshing with the elevating gear 408a. The other input of the differential 738b, the gear 379, meshes with a double gear 369 which is the output gear of the differential 738a. The inputs of this differential are the shaft 734a which is geared to the training disc 405 and the shaft 386 on which the hand wheel 407 is mounted.

e connections for orienting the ring 309a of
nodel-holder are shown in Figs. 15 and 13.
ready explained, the turning of the output
743a of the differential 742 orients the model
lanes by turning the ring 309a and the gear
341 simultaneously. As shown in Fig. 13,
teering wheel 108 is connected by a horizon-
aft 214 to a vertical shaft 746a. Fig. 9 in-
es diagrammatically a mechanical connec-
746b passing through the tube 777 and
ecting the shaft 746a with a hollow shaft
which is one of the input shafts of the dif-
tial 742 shown in Fig. 15. The other input
e differential 742 is the gear 747a which is
ected by the gear 749a to the output shaft
of the differential 704.
e connections to and from the computer 500
been described in connection with the de-
tion of the computer, except for the connec-
between the pedal 109 and the computer
503 which is shown in Fig. 9 and consists
evel gears 756a connecting the shaft 144,
is connected to the pedal 109, with a hori-
l shaft 756b which has a mechanical con-
on 756c extending through the tube 777 to
haft 503 of the computer.

Use of fire director e fire director apparatus which has been de-
ed in detail operates in the manner already
ibed in connection with the diagrammatic
ings. The practical use of the fire director
res a gun crew of three operators and a com-
ler seated on seats carried by the gun car-
602a. Operator No. 1 handles the target-
ver controlling the steering wheel 108 and
ls 109 and 209 and observing along and
gh the sight tube 104a. Operator No. 2 ob-
s through the eye-piece 420 of the telescope
nd regulates the pointing of the telescope by
wheels 406, 407 and the focusing by hand
l 409. Operator No. 3 observes through the
iece 421 of the telescope and controls the
ing and elevating hand wheels 305 and 307a.
commander observes the indications of the
of the computer 500 and operates the hand
ls 508 and 510.
en an enemy airplane is seen approaching,
tor No. 1 pushes down pedal 109 to full
l, observes the motion of the arrow 143 in
ky and directs it by means of the hand wheel
ntil it is aligned with the approaching air-
. He then observes the airplane through
ube 104a, adjusts the steering wheel 108 until
ross hair 141 parallel to the arrow remains
e airplane, and at the same time adjusts
edal 109 so that the other cross hair re-
s on the airplane. If operator No. 1 is ac-
med to automobile driving, he can set the
line of the target-follower on the airplane
few seconds and then maintain it on the
ane without difficulty by adjustment of the
l 109. Most desirably, however, he shifts his
from the pedal 109 to the pedal 209 as soon
has set the cross hairs on the airplane so
he may maintain the cross hair 142 on the
ane by merely holding the pedal 209 sta-
ry or making slight adjustments in case the
l or the height of the approaching airplane
ges. This has the effect of directing the
tube 104a at the airplane A1 and directing
un, the model-carrier 300 and the telescope
t the point A moving at the same speed of
irplane and slightly behind it (see Fig. 19).
on as this has been done, operators Nos. 2 and 3 see the airplane as well as the model air-
planes 1 to 7 through the eye-pieces 410, 411, as
shown in Fig. 20A.

Operator No. 2 adjusts the telescope 400 by
means of hand wheels 406, 407 to bring the air-
plane into the middle of the field as shown in
Fig. 20B. This adjustment has the effect of shift-
ing the optical axis of the telescope from the
point A to the point A1 (Fig. 19).

Operator No. 3 manipulates the training and
elevating hand wheels 305 and 307a to bring the
one of the model airplanes which appears slight-
ly larger than the real airplane into coincidence
with it, as shown with respect to the model air-
plane 4 in Fig. 20C. At the same time operator
No. 2 adjusts hand wheel 409 to bring this model
airplane into sharp focus.

The commander in the meantime, as soon as
the type of enemy airplane has been identified,
has turned the hand wheel 510 to bring the ar-
row on the disc 528 opposite to one of the marks
representing this type of plane on the dial 529.
Operator No. 3 announces the number of the
model which he is bringing into coincidence with
the airplane and states whether he proposes to
compare its wing spread or its length with that
of the airplane. The commander then adjusts
hand wheel 508 to bring the number on the dial
507 corresponding with the announced model
number into coincidence with the curve 512 on
the gear 505, and also adjusts hand wheel 510,
if necessary, to set it on the particular line cor-
responding to the dimension of the airplane
which is to be compared with the model.

These simultaneous operations take only a few
seconds and have the effect of shifting the axes
of the gun and the model holder from the point
A1 to the point A3 (Fig. 19) without changing
the position of the telescope or of the target-
follower. Operators Nos. 2 and 3 continue to ob-
serve through the telescope and at the moment
when the specified dimension of the model air-
plane in line with the real airplane appears to
be the same as the corresponding dimension of
the real airplane, operator No. 3 fires the gun.

Operator No. 2 then brings the next larger
model into sharp focus, while operator No. 3
manipulates hand wheels 305 and 307a to bring
this model into coincidence with the real air-
plane. The commander observes the dial 507
and ordinarily finds the number of the new model
on this dial in coincidence with the curve 512 so
that no further adjustment of the hand wheel
508 is necessary. As soon as the airplane ap-
pears to be of the same size as the next model,
the gun is fired again. The sizes and number
of the model airplanes may be made such as to
permit firing the gun as frequently as the firing
mechanism permits.

In the claims which follow, the words "train-
ing" and "elevating" are used in their ordinary
sense to indicate swinging about vertical and
horizontal axes, while the words "sight" and
"turn-table" are used in a general sense to in-
dicate respectively any device which provides for
viewing an object along a line of sight and any
supporting member mounted for turning about
an axis.

What I claim is:

1. Fire director apparatus comprising the com-
bination with a gun, of a manually-controlled
target-follower sight, a comparator sight con-
taining a model of a target, means operated by
the target-follower sight for setting the line of
sight of the comparator behind and below the axis of the gun by the horizontal and vertical deviations required for firing when a target appears the same size as the model in the comparator sight, power-driven means controlled by the target-follower sight for pointing the gun and the comparator sight approximately towards a target on which the target-follower sight is held, and manually-operable means independent of said power means and independent of the target-follower for simultaneously adjusting the direction of the line of sight of the comparator and the axis of the gun.

2. Fire director apparatus comprising the combination with a gun, of a manually-controlled target-follower sight, a comparator sight containing a model of a target, means operated by the target-follower sight for setting the line of sight of the comparator behind and below the axis of the gun by the horizontal and vertical deviations required for firing when a target appears the same size as the model in the comparator sight, and means separate from said setting means for training and elevating the line of sight of the comparator and the axis of the gun.

3. Fire director apparatus comprising the combination with a gun, of a manually-controlled target-follower sight, a comparator sight containing a model of a target, first indicating means operated by the target-follower sight for indicating the course of the target, second indicating means operated by the target-follower sight for indicating the speed of the target divided by its distance, means operable in accordance with said second indicating means for setting the line of sight of the comparator away from the axis of the gun by the horizontal and vertical deviations required for firing on the target when it appears the same size as the model in the comparator sight, means operated by the first indicating means for setting the horizontal deviation between the axis of the gun and the line of sight of the comparator parallel to the course of the target, and means separate from said setting means for training and elevating the line of sight of the comparator and the axis of the gun.

4. Fire director apparatus comprising a target-follower comprising a horizontal turn-table, manual means for turning the turn-table, a slide mounted on the turn-table for movement along a radius thereof, manual means for moving said slide, a sight tube having one end hinged to said slide, a support slidably engaging the other end of the sight tube, means for retaining said support at a fixed distance from the center of the turn-table, means for causing relative movement between the turn-table and the support to train and elevate the line between the center of the support and the center of the turn-table, a power drive for said training and elevating means including a variable-speed transmission controlled by said two manual means, and a coacting rack and pinion on the sight tube and the support; an aiming pointer comprising a horizontal, turnable model-carrier, a model airplane mounted in the model-carrier, means for moving the model along a radius of the model-carrier, a telescope for viewing the model from a viewpoint spaced from the carrier, manual means for causing relative movement between the model-carrier and the telescope to place the model on the optical axis of the telescope, and manual means for focusing the telescope on the model; and connections to the model-moving means of the aiming pointer from the slide and the pinion of the target-follower and from the focusing means of the telescope.

5. Fire director apparatus including a target follower sight having a turnable element, a radius of which is oriented to the course of a target followed by the sight, and a comparator sight including a turnable model-carrier and a model airplane adjustable along a radius thereof, and a connection between the turnable element of the target-follower and the turnable model-carrier of the comparator sight arranged to keep said radii parallel.

6. Fire director apparatus comprising the combination with a gun, of a manually-controlled target-follower sight and a comparator sight, power means controlled by the target-follower sight for pointing the gun and the comparator sight at a point slightly behind an airplane on which the target-follower sight is directed, means operated by the target-follower sight for setting the line of sight of the comparator slightly behind the axis of the gun, and manually-operable means for simultaneously changing the training and elevation of the sight line of the comparator and the axis of the gun, and means for preventing said manually operable means from changing the training and elevation of the target-follower sight.

7. Fire director apparatus comprising the combination with a gun, of a manually-controlled target-follower sight and a comparator sight including a model airplane and a telescope between which extends the line of sight of the comparator, power means controlled by the target-follower sight and connected to the gun and to the telescope and to the model to direct the axis of the gun, the optical axis of the telescope and the comparator line of sight approximately toward an airplane on which the target-follower sight is held, means for moving the telescope independently of the power means to direct its optical axis at the airplane, means controlled by the target-follower sight for moving the model airplane independently of the power means to set the comparator line of sight at a deviation to the axis of the gun, and manually-operable means independent of said power means connected to the gun and to the model for shifting the axis of the gun and the comparator line of sight without affecting the target-follower sight or the telescope.

8. In fire director apparatus, a target-follower comprising a sight having sighting points adjacent to its ends to determine a line of sight, manual means for moving one end of the sight, and automatic means controlled by said manual means for moving the other end of the sight.

9. In fire director apparatus, a target-follower comprising a sight, a horizontal turn-table, manual means for moving a rearpoint of the sight along a radius of the turn-table, separate manual means for rotating the turn-table to change the bearing of said radius, and automatic means controlled by said manual means for moving a front point of the sight in a plane containing said radius of the turn-table and at a speed in said plane which varies directly with the distance between the rear point of the sight from the center of the turn-table.

10. In fire director apparatus, a target-follower comprising a turn-table, a steering wheel connected to said turn-table to turn it, a universal joint mounted on said turn-table for movement along one radius thereof, a pedal for moving said universal joint along said radius, a sight having its rear end mounted in said universal joint, and matic means controlled by said steering
:l and pedal for moving the front end of the
; in a plane containing said radius of the
-table and at a speed which varies directly
the distance between the rear end of the
t from the center of the turn-table, so that
steering wheel controls the direction of move-
t and the pedal the rate of movement of the
t towards which the sight is directed.

. In fire director apparatus, a target-follower
prising a sight, manual means for moving a
point of the sight along a radius of a hori-
al circle, separate manual means for swing-
said radius about the center of the circle, and
matic means controlled by said manual
ns to move a front point of said sight on an
of a circle in a plane containing said radius
,n angular rate of movement which is di-
ly proportional to the distance from the cen-
of the circle to the rear point multiplied by
sine of the angle between said radius and a
from the center of the circle to the front
.t.

!. In fire director apparatus, a target-follower
prising a horizontal turn-table, manual
ns for turning the turn-table, a slide mount-
n the turn-table for movement along a radius
eof, manual means for moving said slide, a
t having one point mounted on said slide, a
port for the sight spaced from the turn-table,
power driven means controlled by said two
ual means for causing relative movement be-
en the turn-table and the support in the plane
aid radius of the turn-table.

3. In fire director apparatus, a target-follower
prising a horizontal turn-table, a steering
el for turning said turn-table, a slide mounted
the turn-table for movement along a radius
reof, a pedal for moving said slide, a sight tube
ged to said slide, an indicator fixed to the
e and having an indicating line in the plane
said radius of the turn-table, a support for
sight tube spaced from the turn-table, means
causing relative movement between the turn-
le and the support to train and elevate a line
ween the point of the sight held by the sup-
t and the center of the turn-table, a power
re for said training and elevating means in-
ling a variable-speed transmission controlled
the steering wheel and pedal.

4. In fire director apparatus, a target-follower
prising a horizontal turn-table, manual
ns for turning the turn-table, a slide mounted
the turn-table for movement along a radius
reof, manual means for moving said slide, a
t tube hinged to said slide, a support slidably
aging the sight tube, means for retaining said
port at a fixed distance from the center of the
n-table, means for causing relative movement
ween the turn-table and the support to train
l elevate the line between the center of the
port and the center of the turn-table, a power
ve for said training and elevating means in-
ding a variable-speed transmission controlled
said two manual means, and co-acting means
the sight tube and the support for indicating
distance between the slide and the support.

l5. In fire director apparatus, a target-follower
nprising a horizontal turn-table, manual
ans for turning the turn-table, a slide mounted
the turn-table for movement along a straight
le line, manual means for moving said slide,
light having one point mounted on said slide,
upport for the sight spaced from the turn-table,
ans for causing relative movement between the
turn-table and said support to train and elevate
the line between the point of the sight held by
said support and a point of the slide line, and a
power drive for said training and elevating means
including a variable-speed transmission controlled
by said two manual means.

16. In fire director apparatus, a target-follower
comprising a horizontal turn-table, manual means
for turning the turn-table, a slide mounted on the
turn-table for movement along a straight slide
line, manual means for moving said slide, a sight
having one point mounted on said slide, a support
for the sight spaced from the turn-table, means
for causing relative movement between the turn-
table and said support to train and elevate the
line between the point of the sight held by said
support and a point of the slide line, and a power
drive for said training and elevating means in-
cluding a variable-speed transmission so con-
trolled by said two manual means that the rates
of training and elevating correspond to the fol-
lowing equations:

$$\frac{dg}{dt} = \frac{e.\sec s}{\Delta.d} \cdot \sin(g - \overline{a})$$

$$2\frac{ds}{dt} = \frac{e.\sec s}{\Delta.d} \cdot \cos(g - \overline{a}) \sin 2s$$

where $g$ is the training angle of the aforesaid line
between said support and turn-table with respect
to a fixed meridian, $s$ is the elevation angle of
said line above the horizontal, $$\frac{dg}{dt} \text{ and } \frac{ds}{dt}$$

are the rates of change in said training and ele-
vating angles, $e$ is the distance of displacement
of the slide from the point of the slide line inter-
sected by said line between the support and the
turn-table, $\bar{a}$ is the bearing of the slide line, and $d$
and $\Delta$ are constants.

17. In fire director apparatus, the combination
with a gun, of a comparator sight containing a
model of a target, a connection between the com-
parator sight and the gun varying the angular
relation between the line of sight of the com-
parator and the axis of the gun by the horizontal
and vertical deviations required for firing when a
target appears the same size as the model in the
comparator sight, and manual means independent
of said setting means for simultaneously training
and elevating the line of sight of the comparator
and the axis of the gun without changing the
horizontal and vertical deviations between them.

18. A comparator sight for indicating the mo-
ment when a moving target is at predetermined
horizontal and vertical distances from a point at
a predetermined firing distance from the sight,
comprising a movable model-carrier and a target
model offset horizontally and vertically from the
center point of the movable model-carrier, a
mounting for the model-carrier permitting it to
revolve with its center point at a fixed distance
from a center of revolution, means for preventing
turning of the model-carrier during its revolu-
tion, the size of the model and its horizontal and
vertical offsets bearing the same ratio to the size
of the target and said predetermined horizontal
and vertical distances as the distance from the
center of revolution of the model-carrier to the
center point of the model-carrier bears to said
predetermined firing distance, so that coincidence
of the target and the model as seen from the cen-
ter of revolution of the model-carrier indicates
the required moment.

19. A comparator sight for indicating the moment when an airplane is at predetermined horizontal and vertical distances from a point which is in front of the airplane and directly above its course and which is at a predetermined firing distance from the sight, comprising a turnable support, a model-carrier, a mounting for the model-carrier on said support permitting the model-carrier to revolve with its center point at a fixed distance from a center of revolution, means for preventing the model-carrier from turning during such revolution, a target model in the model-carrier offset vertically below the center point of the model-carrier and offset horizontally from the center point of the model-carrier in a direction opposite to the course of the airplane, the size of the model and its horizontal and vertical offsets bearing the same ratio to the size of the target and said predetermined horizontal and vertical distances as the distance from the center of revolution of the model-carrier to the center point of the model-carrier bears to said predetermined firing distance, and means on the support for viewing the model from the center of revolution of the model-carrier.

20. A comparator sight comprising a turnable support, a movable model-carrier, a mounting for the model-carrier permitting it to revolve about a center and preventing it from turning during such revolution, a target model eccentrically located on the model-carrier, and optical means on the support for viewing the model from the center of revolution of the model-carrier and measuring its distance therefrom.

21. In fire director apparatus, the combination with a gun, of an aiming pointer for aiming the gun to hit a moving target, comprising a horizontal, turnable model-carrier, a model airplane mounted in the model-carrier for movement along a radius thereof, means for orienting the model-carrier to point the model in the direction of the course of the target, means for setting the distance of the model from the axis of the model-carrier in accordance with the speed of the target, optical means for viewing the model from a viewpoint spaced from the carrier, manual means for causing relative movement between the model-carrier and the optical means to place the model on a line between the viewpoint and the target, and a connection between the model-carrier and the gun maintaining the axis of the gun parallel to the line connecting the viewpoint and a point on the axis of the model-carrier at a fixed distance above the model.

22. In fire director apparatus, the combination with a gun, of an aiming pointer for directing the gun to hit a moving target, comprising a horizontal, turnable model-carrier, a model of the target mounted in the model-carrier for movement along a radius thereof, means for orienting the model-carrier to point this radius in the direction of the course of the target, means for setting the distance of the model from the axis of the model-carrier in accordance with the speed of the target, a telescope for viewing the model from a viewpoint spaced from the carrier, manual means for training and elevating the telescope about the viewpoint to direct its optical axis toward the target, manual means for causing relative movement between the model-carrier and the telescope to place the model on the optical axis of the telescope, and a connection between the model-carrier and the gun maintaining the axis of the gun parallel to the line connecting the view- point and a point on the axis of the model carrier at a fixed distance above the model.

23. In fire director apparatus, the combinati with a gun, of an aiming pointer comprising turnable model-carrier, optical means for vie ing models in said carrier from a viewpoint spac from the carrier, a connection between the mod carrier and the gun maintaining the axis of t gun parallel to the line connecting the viewpo with a point on the axis of the model-carrier, plurality of model airplanes of different sizes in the model-carrier at different fixed vertical d tances from said point, and means for simu taneously offsetting all the models from the a of the model-carrier in a common radial pla of the model-carrier by distances bearing fix relations to one another.

24. In fire director apparatus, the combinati with a gun, of an aiming pointer comprising turnable model-carrier, optical means for vie ing models in said carrier from a viewpoint space from the carrier, a connection between the mode carrier and the gun maintaining the axis of t gun parallel to the line connecting the viewpoi with a point on the axis of the model-carrie a plurality of model airplanes of different siz set in the model-carrier at different fixed vertic distances from said point, means for simultan ously offsetting all the models from the axis the model-carrier in a common radial plane the model-carrier by distances bearing fixed rel tions to one another, and means for simu taneously moving the model-carrier with respe to the optical means and the models with respe to the carrier to vary the distance between th viewpoint and the model-carrier and the offse of the models from the axis of the model-carrie 25. In fire director apparatus, the combinatio with a gun, of an aiming pointer comprising turnable model-carrier, optical means for view ing models in said carrier from a viewpoint space from the carrier, a connection between the model carrier and the gun maintaining the axis of th gun parallel to the line connecting the viewpoin with a point on the axis of the model-carrier, model airplane mounted in the model-carrier be low said point, means for moving the model alon a radius of the model-carrier, and separate mean for simultaneously moving the model-carrie away from the viewpoint and the model awa from the axis of the model-carrier.

26. In a comparator sight, a model-holder com prising a support, a movable member, a pair o parallel rods of equal length hinged to the sup port and to the movable member to permit th member to move in an arc without tipping, model-carrier ring and a gear annulus co-axiall and turnably mounted in the movable member a shaft journalled in said ring, a pinion on sai shaft engaging the gear annulus, a model on sai ring so connected to said shaft that it is moved radially of the ring by turning of the shaft, a first turning means on the support, a connection between said turning means and the ring extending through one of said parallel rods, a second turning means on the support, a connection between said turning means and the gear annulus extending through the other of said parallel rods, means for rotating said two turning means simultaneously to orient the model without displacing it, and means for rotating the second turning means independently of the first turning means to displace the model radially without changing its orientation.

27. In a comparator sight, a telescope for prog registering sharp images of a distant ob-
nd a near object comprising an object lens,
ljustable eye-piece behind the object lens,
arallel mirrors in front of the object lens
ting light from a distant object and from
r object to the object lens, and two lenses
en one of said mirrors and the object lens,
ne nearer the object lens being manually
table.

A drive mechanism for a target-follower
rising the combination with two control
s whose turning movements are designated
l e, two output shafts whose turning move-
s are designated g and s and a constant-
l motor, of a first variable-speed transmis-
connected to the constant-speed motor and
d and third variable-speed transmissions
ected between the first variable-speed trans-
on and the two output shafts, controlling
ections between one of the control shafts
one of the output shafts and the first vari-
speed transmission maintaining its speed
proportional to $e \sec s$, controlling connec-
from one of the control shafts and one
e output shafts to the second variable-speed
mission making its speed ratio proportional
n $(g-a)$ and controlling connections be-
n one of the control shafts and both of the
ut shafts and the third variable-speed trans-
ion making its speed ratio proportional to $$\sin 2s \, (\cos (g-a))$$

at the rates of rotation of the two driven
ts are proportional respectively to $$e \sec s.\sin (g-a)$$

$$e \sec s.\sin 2s.\cos (g-a)$$

. Fire director apparatus comprising the
bination with a gun, of a manually-con-
ed target-follower sight independent of the
an aiming sight connected to the gun, means
ated by the target-follower sight for setting
line of sight of the aiming sight behind and
below the axis of the gun by the required horizontal and vertical deviations, power-driven means controlled by the target-follower sight for pointing the gun and the aiming sight slightly behind a target on which the target-follower sight is held, and manually-operable means independent of said power means and independent of the target-follower sight for simultaneously adjusting the direction of the aiming sight and the axis of the gun.

30. In fire director apparatus comprising a turn-table, manual means for turning the turn-table, a slide mounted on the turn-table for movement along a straight slide line, manual means for moving said slide along said slide line, a support separate from the turn-table, means for causing relative movement between the turn-table and the support to train and elevate a line extending between a point of the support and a point of the slide line of the turn-table, a power drive for said training and elevating means including a variable speed transmission controlled by said two manual means, and means for sighting along or parallel to a line extending from a point of the slide to said point of the support.

31. A comparator sight comprising a turnable support, a movable model-carrier, a mounting for the model-carrier permitting it to revolve about a center and preventing it from turning during such revolution, a target model eccentrically located on the model-carrier, and optical means on the support for viewing the model from the center of revolution of the model-carrier.

32. In fire director apparatus, the combination with a gun mounted for training and elevating movements, of a target-follower comprising a sight having sighting points adjacent to its ends to determine a line of sight, manual means for moving one end of the sight, and automatic means controlled by said manual means for training and elevating the other end of the sight and the gun.

ANTONIN SVOBODA.

Certificate of Correction

Patent No. 2,372,613.  March 27, 1945.

ANTONIN SVOBODA

It is hereby certified that errors appear in the printed specification of the above numbered patent requiring correction as follows: Page 4, first column, line 45, Equation 14, for "c—" read $c=$; and second column, lines 55–56, for "adjusment" read *adjustment*; page 6, first column, line 23, Equation 24, for "$D_1 = \frac{U}{u} b^{1}$" read $D_1 = \frac{U}{u} b_1$; line 36, Equation 25, for "$k_3$" read $k_2$; line 51, for "valuble" read *valuable*; line 68, Equation 26, for "$\frac{1}{W}$" read $\frac{1}{w}$; line 73, Equation 27, for "$\frac{X}{W}$" read $\frac{x}{w}$; page 13, second column, lines 55 and 70 respectively, for "$S\delta$" read $S_\delta$; page 14, second column, line 27, for "$\frac{1}{W}$" read $\frac{1}{w}$; and line 34, for "movement" read *movements*; page 15, first column, line 23, strike out the word "respectively"; and that the said Letters Patent should be read with these corrections therein that the same may conform to the record of the case in the Patent Office.

Signed and sealed this 31st day of July A. D. 1945.

[SEAL]

LESLIE FRAZER,
*Acting Commissioner of Patents.*